(12) United States Patent
Gazzola

(10) Patent No.: US 8,060,102 B2
(45) Date of Patent: Nov. 15, 2011

(54) SYSTEM AND METHOD FOR COVERAGE ANALYSIS IN A WIRELESS NETWORK

(75) Inventor: James Peter Gazzola, Mississauga (CA)

(73) Assignee: BCE Inc., Verdun, Quebec (CA)

( * ) Notice: Subject to any disclaimer, the term of this patent is extended or adjusted under 35 U.S.C. 154(b) by 1553 days.

(21) Appl. No.: 11/010,338

(22) Filed: Dec. 14, 2004

(65) Prior Publication Data

US 2006/0128372 A1 Jun. 15, 2006

(51) Int. Cl.
H04W 40/00 (2009.01)

(52) U.S. Cl. ......... 455/446; 455/423; 455/436; 455/454

(58) Field of Classification Search .................. 455/446, 455/423, 436, 454
See application file for complete search history.

(56) References Cited

U.S. PATENT DOCUMENTS

| | | | |
|---|---|---|---|
| 5,095,500 A | 3/1992 | Tayloe et al. | |
| 5,828,960 A | 10/1998 | Tang et al. | |
| 6,173,175 B1 | 1/2001 | Alazma et al. | |
| 6,317,599 B1 | 11/2001 | Rappaport et al. | |
| 6,466,560 B1 * | 10/2002 | Lee et al. | 370/335 |
| 6,499,006 B1 | 12/2002 | Rappaport et al. | |
| 6,654,613 B1 | 11/2003 | Maeng et al. | |
| 6,711,404 B1 * | 3/2004 | Arpee et al. | 455/423 |
| 2003/0129987 A1 | 7/2003 | Tanay et al. | |
| 2005/0136928 A1 * | 6/2005 | Zaki | 455/436 |

OTHER PUBLICATIONS

Office Action issued by the Canadian Intellectual Property Office on Jan. 6, 2010 in connection with corresponding Canadian Patent Application No. 2,528,272, 6 pages.

Website printout from www.atdi.com, ATDI Radio Network Planning Solutions: Newsletter, dated Apr. 21, 2005 (2 pages).
Website printout from www.abletron.com, Abletron PTE Ltd.: CMD 80-Communications Test Sets, dated Apr. 21, 2005 (7 pages).
Website printout from www.dingli.com, DingLi Communications Inc.: Planning Tools-InSight GSM, dated Apr. 21, 2005 (3 pages).
Thiago H. et al., Survey: A System for Propagation Analysis in Mobile Communication Environments, Telecomunicaoes, vol. 04, Dec. 2001.
Dong-You et al., A Cell Patter Decision for Improvement Ec/lo in CDMA Mobile Communication, Improving Wireless Network Design Accuracy, The Critical Impact of a Quality Geodata and Clutter Foundation, Marconi Wireless , at least as early as Apr. 4, 2005.

* cited by examiner

*Primary Examiner* — Patrick Edouard
*Assistant Examiner* — Chuck Huynh

(57) ABSTRACT

The present invention is a system and method for coverage analysis in a wireless network. The invention seeks to evaluate the location and characteristics of a proposed base station in a wireless communication network, prior to the base station being erected. Data is collected from both: a test transmitter of known characteristics, erected at the proposed location for the proposed base station; and from a plurality of wireless channels of the existing network. The data may be collected at a plurality of measurement locations. The collected data is used to model and subsequently evaluate the behaviour of the network in the presence of channels that would be introduced into the network if the new base station were erected. Modeled data may include estimates of signal to noise ratios for various wireless channels for both existing base stations and the proposed base station, at the measurement location. The model data may be displayed on a GUI, depicting modeled signal characteristics in a geographical area surrounding the proposed base station, to estimate overall acceptability of a proposed base station at a proposed location before incurring the cost of installing the base station.

26 Claims, 12 Drawing Sheets

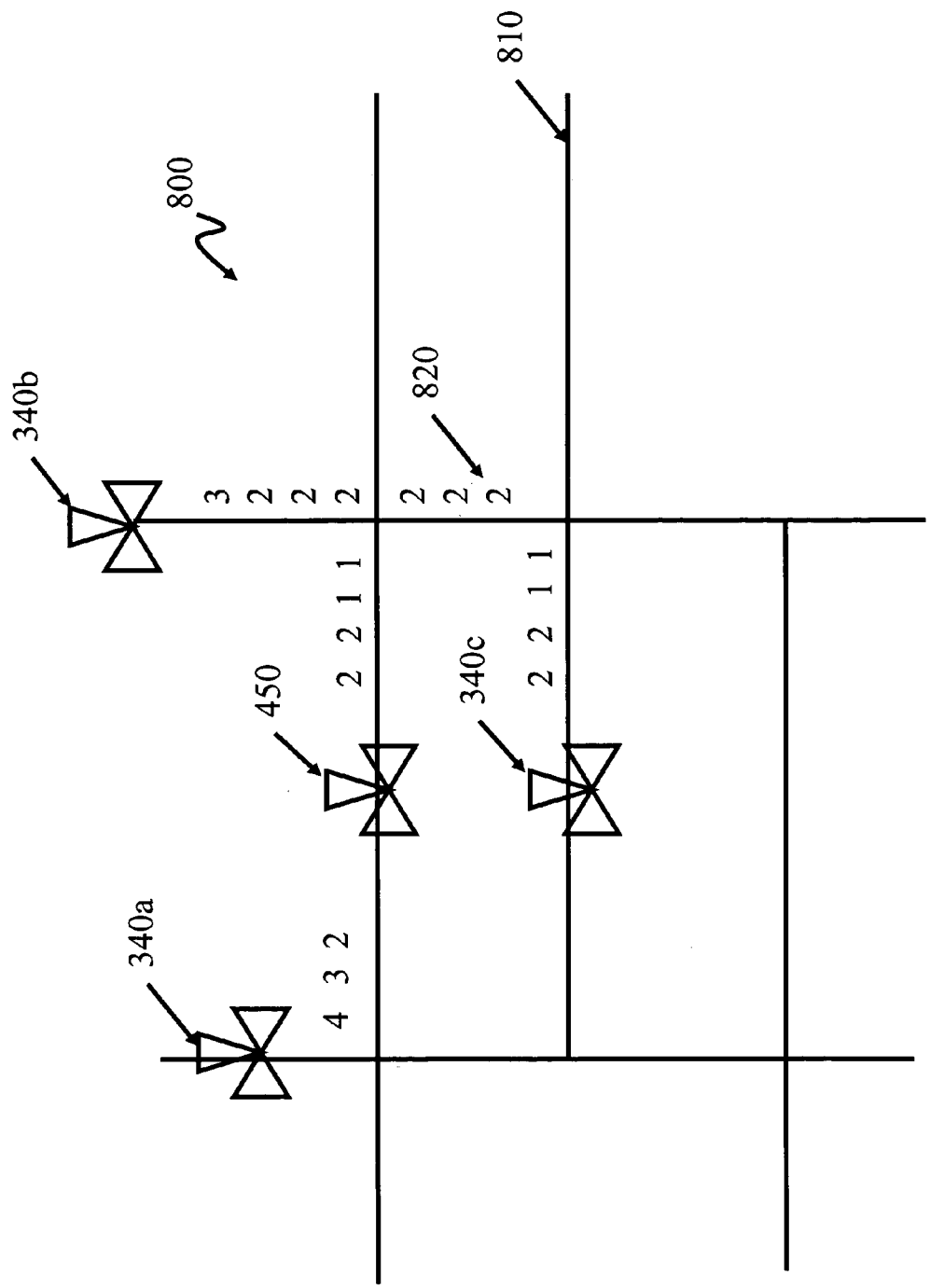

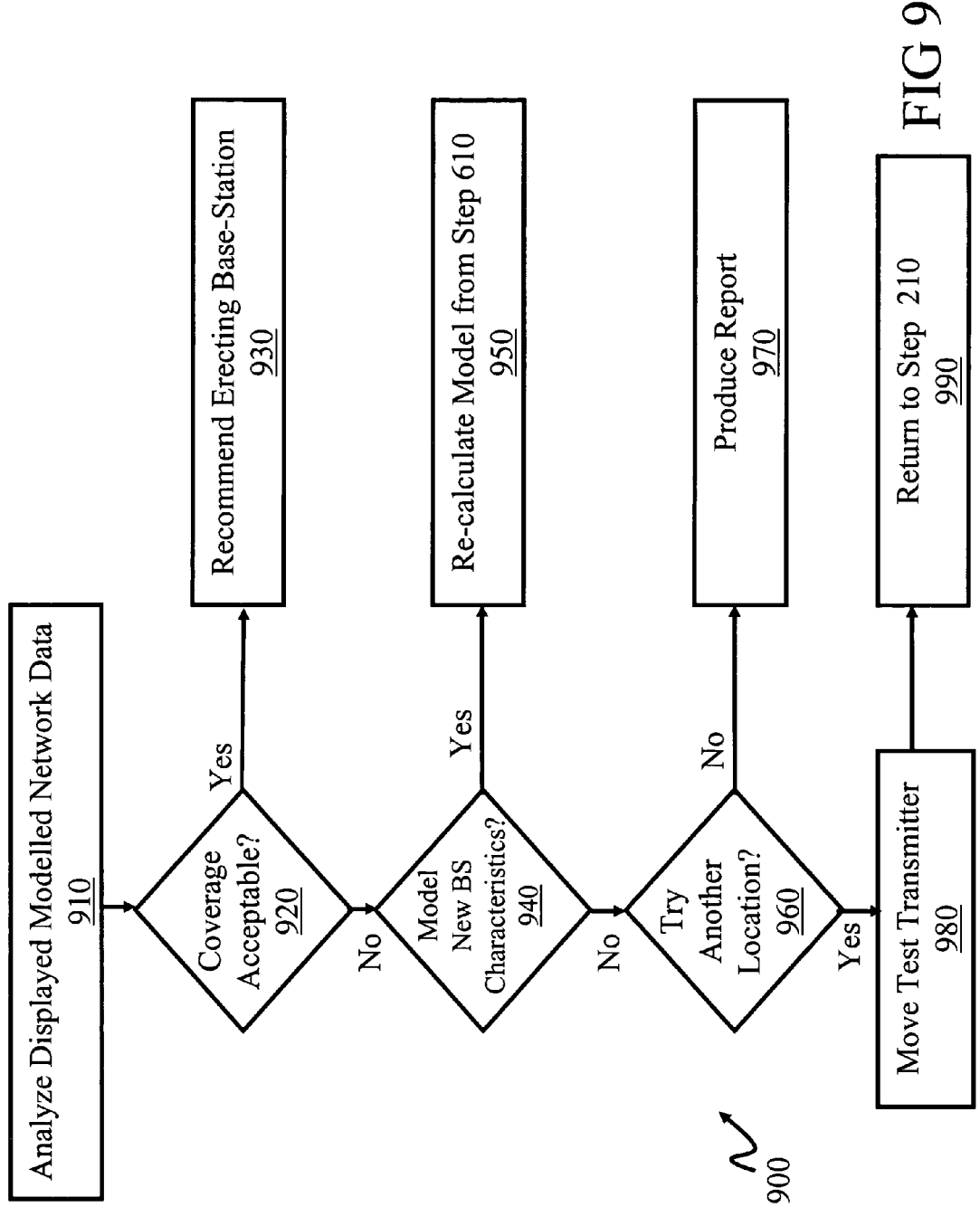

| Measurement Type | Time | Sequence ID | Longitude | Latitude | RSSI (dBm) | $P_N$ | Frequency (MHz) |
|---|---|---|---|---|---|---|---|
| TTSj | 12:00.00.1 | 1 | -79.3442 | 43.76658 | -53.8906 | | 1.95E+09 |
| TTSj | 12:00.00.2 | 2 | -79.3441 | 43.76659 | -53.9219 | | 1.95E+09 |
| TTSj | 12:00.00.3 | 3 | -79.3440 | 43.76660 | -55.3438 | | 1.95E+09 |
| TTSj | 12:00.00.4 | 4 | -79.3439 | 43.76661 | -54.9063 | | 1.95E+09 |
| Ecj, $P_{Nj}$ | 12:00.00.5 | 5 | -79.3438 | 43.76662 | -64.1459 | 224 | |
| Ecj, $P_{Nj}$ | 12:00.00.5 | 5 | -79.3438 | 43.76662 | -65.1969 | 256 | |
| Ecj, $P_{Nj}$ | 12:00.00.5 | 5 | -79.3438 | 43.76662 | -65.8728 | 88 | |
| Ecj, $P_{Nj}$ | 12:00.00.5 | 5 | -79.3438 | 43.76662 | -65.9632 | 324 | |
| Ecj, $P_{Nj}$ | 12:00.00.5 | 5 | -79.3438 | 43.76662 | -66.1104 | 108 | |
| Ecj, $P_{Nj}$ | 12:00.00.5 | 5 | -79.3438 | 43.76662 | -66.2549 | 340 | |
| Ecj, $P_{Nj}$ | 12:00.00.5 | 5 | -79.3438 | 43.76662 | -66.4013 | 316 | |
| Ecj, $P_{Nj}$ | 12:00.00.5 | 5 | -79.3438 | 43.76662 | -66.4805 | 48 | |
| Ecj, $P_{Nj}$ | 12:00.00.5 | 5 | -79.3438 | 43.76662 | -66.4844 | 80 | |
| Ecj, $P_{Nj}$ | 12:00.00.5 | 5 | -79.3438 | 43.76662 | -53.1217 | 228 | |
| Io | 12:00.00.5 | 5 | -79.3438 | 43.76662 | -45.8616 | | |
| TTSj | 12:00.00.6 | 6 | -79.3437 | 43.76661 | -54.7656 | | 1.95E+09 |
| TTSj | 12:00.00.7 | 7 | -79.3436 | 43.76660 | -55.5469 | | 1.95E+09 |
| TTSj | 12:00.00.8 | 8 | -79.3435 | 43.76659 | -55.9688 | | 1.95E+09 |
| TTSj | 12:00.00.9 | 9 | -79.3434 | 43.76658 | -57.4219 | | 1.95E+09 |
| Ecj, $P_{Nj}$ | 12:01.00.0 | 10 | -79.3433 | 43.76657 | -63.8472 | 224 | |
| Ecj, $P_{Nj}$ | 12:01.00.0 | 10 | -79.3433 | 43.76657 | -66.2547 | 404 | |
| Ecj, $P_{Nj}$ | 12:01.00.0 | 10 | -79.3433 | 43.76657 | -66.2229 | 260 | |
| Ecj, $P_{Nj}$ | 12:01.00.0 | 10 | -79.3433 | 43.76657 | -66.1477 | 36 | |
| Ecj, $P_{Nj}$ | 12:01.00.0 | 10 | -79.3433 | 43.76657 | -66.0907 | 340 | |
| Ecj, $P_{Nj}$ | 12:01.00.0 | 10 | -79.3433 | 43.76657 | -65.8406 | 200 | |
| Ecj, $P_{Nj}$ | 12:01.00.0 | 10 | -79.3433 | 43.76657 | -65.8141 | 324 | |
| Ecj, $P_{Nj}$ | 12:01.00.0 | 10 | -79.3433 | 43.76657 | -64.6095 | 316 | |
| Ecj, $P_{Nj}$ | 12:01.00.0 | 10 | -79.3433 | 43.76657 | -52.8234 | 228 | |
| Ecj, $P_{Nj}$ | 12:01.00.0 | 10 | -79.3433 | 43.76657 | -65.6572 | 448 | |
| Io | 12:01.00.0 | 10 | -79.3433 | 43.76657 | -44.9384 | | |
| TTSj | 12:01.00.1 | 11 | -79.3432 | 43.76658 | -57.9688 | | 1.95E+09 |
| TTSj | 12:01.00.2 | 12 | -79.3431 | 43.76659 | -58.0156 | | 1.95E+09 |
| TTSj | 12:01.00.3 | 13 | -79.3430 | 43.76660 | -57.6094 | | 1.95E+09 |
| TTSj | 12:01.00.4 | 14 | -79.3429 | 43.76661 | -57.1563 | | 1.95E+09 |
| Ecj, $P_{Nj}$ | 12:01.00.5 | 15 | -79.3428 | 43.76662 | -63.8472 | 224 | |
| Ecj, $P_{Nj}$ | 12:01.00.5 | 15 | -79.3428 | 43.76662 | -66.2547 | 404 | |
| Ecj, $P_{Nj}$ | 12:01.00.5 | 15 | -79.3428 | 43.76662 | -66.2229 | 260 | |
| Ecj, $P_{Nj}$ | 12:01.00.5 | 15 | -79.3428 | 43.76662 | -66.1477 | 36 | |
| Ecj, $P_{Nj}$ | 12:01.00.5 | 15 | -79.3428 | 43.76662 | -66.0907 | 340 | |
| Ecj, $P_{Nj}$ | 12:01.00.5 | 15 | -79.3428 | 43.76662 | -65.8406 | 200 | |
| Ecj, $P_{Nj}$ | 12:01.00.5 | 15 | -79.3428 | 43.76662 | -65.8141 | 324 | |
| Ecj, $P_{Nj}$ | 12:01.00.5 | 15 | -79.3428 | 43.76662 | -64.6095 | 316 | |
| Ecj, $P_{Nj}$ | 12:01.00.5 | 15 | -79.3428 | 43.76662 | -52.8234 | 228 | |
| Ecj, $P_{Nj}$ | 12:01.00.5 | 15 | -79.3428 | 43.76662 | -65.6572 | 448 | |
| Io | 12:01.00.5 | 15 | -79.3428 | 43.76662 | -44.9384 | | |

Figure 10

SYSTEM AND METHOD FOR COVERAGE ANALYSIS IN A WIRELESS NETWORK

FIELD OF THE INVENTION

The present invention is directed to wireless communications networks and, in particular to a system and method for coverage analysis in a wireless network.

BACKGROUND OF THE INVENTION

The use of cell phones has become ubiquitous in today's society, with the use of such devices growing exponentially worldwide with each passing year. Consequently, planning of such networks has become more challenging as each base station, which receives and transmits cell-phone data, can process only a limited amount of such data on a particular range of frequencies or range of channels.

Several methods currently exist to address this increasing volume of data. A first method is to add a new network to the existing network by adding new radios to existing base stations, the new network operating at a different range of frequencies from the existing network. However this has the disadvantage of having to deploy the radios and associated equipment uniformly across the network, with each existing base station being outfitted with the new equipment to maintain consistent quality of service. The associated cost of this deployment is very high, and additionally over-utilizes precious spectrum resources. Non-uniform addition of radios leads to conditions where a cell-phone moving within the coverage area may have to switch networks as it moves from an area equipped with new radios to an area lacking new radios, a process known as a hard hand-off. Hard hand-offs are not reliable, leading to an increased number of dropped calls and thus degraded quality of service.

A second method of addressing increased volume is to add more base station sites in the network, operating at the existing range of frequencies. However it is important to carefully plan the location of these new sites as the cost of erecting a base station is high, including the equipment and cost of a long-term lease of a site. Introducing a new base station can be problematic in areas where several base station signals are detectable by a cell-phone located in these areas. Indeed signals from existing base station sites, even some distance from the location of a cell-phone, may also be detected by the cell-phone. The disadvantage of having more than three strong base station signals in an area is that interference between possible hand-off states will occur, again leading to an increased numbers of dropped calls and degraded quality of service. Current network planning methods do not adequately address this situation.

Hence, evaluating the location and characteristics of a proposed base station can be a challenging process as it is important to ensure both acceptable coverage of an area as well as limiting the number of possible hand-off states, a balance between too few available signals and too many. However, current techniques for optimizing base station locations are concerned mainly with the impact of land-cover and terrain on the coverage of an area, and ignore problems associated with accurately ensuring a limited number of hand-off states. If the base station, when built, improves network coverage in one area, but results in a detrimental number of hand-off states in areas which overlap with adjacent base stations, the result can be decreased quality of service or suboptimal capacity in these overlap areas and a need to either move the base station or build additional base stations to solve the problem, both unfavourably expensive options.

Currently, planning of base station locations is carried out in a two step method. In a first step, areas which are not being adequately covered by the existing network are identified. This is accomplished by measuring existing network signal strength along a grid in a given area. In spread spectrum systems such as CDMA networks, for example, a motorized vehicle equipped with a PN scanner and an antenna collects signal data from base stations located in an area thought to have poor coverage, or an increasing volume of cellphone calls. A PN scanner is a commercially available device which measures identifying signals, Ec, from individual base stations, known as pilot channels in a CDMA network, as well as total network signal activity or power spectrum density, Io, while concurrently recording the time and location of each measurement, location being measured using a Global Positioning System (GPS). Signal to noise ratio, Ec/Io, can than be generated for each measured channel and combined with the location data to obtain a map of existing network activity over a given area. Ec/Io is mapped instead of channel strength as the channel strength must be greater than the noise to be detectable by a cellphone. In this manner the degree of coverage of a network can be determined and areas which are receiving inadequate coverage or quality can be identified.

In a second separate step possible base stations sites are identified. This is currently carried out using one of a number of commercial software modeling programs, such as Marconi's PlanetEV. These software packages attempt to predict coverage of base stations in a network, including a proposed base station, by using existing digital terrain and land-cover maps of a given geographic area, usually taken from a geographic database, and subsequently modeling the signal strength of each channel at various points in the area using propagation models such as the Okumura-Hata model to predict the impact of land-cover on the signal, and the Longley-Rice model to predict the impact of terrain on the signal. Land-cover, defined as non-geographic features which affect signal strength, such as buildings or foliage, are important to these models as the location of these features have a major impact on the behaviour of a signal. Once the model predicts the best location of a new site, a lease may be negotiated with a landlord and the site is built. These software modeling programs may also be used to identify areas which are not being adequately covered. However a disadvantage of these methods is that the simulations are often inaccurate as the land-cover models they are based on assume unrealistic uniformity of buildings and foliage.

Another disadvantage to these methods is that they cannot directly take into account the effect of the new base station on the existing network except through the limited simulation models described above. Though some empirical techniques exist to improve the land-cover model, the simulation still has no accurate picture of existing network coverage. In any event, the result is that the program predicts the effect of a model base-station on a simulated network.

There remains therefore a need for an improved method of evaluating the proposed location of a proposed base station which more accurately takes into account the activity of the existing network.

SUMMARY OF INVENTION

A first broad aspect of the present invention seeks to provide a method for analysing a wireless network with a proposed base station added at a proposed location. The first step of the method comprises receiving first data representative of a test signal received at a measurement location from a test transmitter at the proposed location, and second data representative of a communication signal received at the measurement location from the existing wireless network. The second step of the method comprises processing the first and second data to estimate a signal characteristic at the measurement location for the wireless network with the proposed base station added.

In some embodiments of the present invention, the first data comprises a signal strength for the test signal received at the measurement location. In this case, the processing step can comprise estimating a signal strength for a signal received at the measurement location from the proposed base station using the signal strength for the test signal. The estimating a signal strength for a signal received at the measurement location can comprise estimating a path loss between the measurement location and the proposed location using the signal strength for the test signal and one or more known characteristics of the test transmitter, and estimating the signal strength for a signal received at the measurement location from the proposed base station using the path loss and one or more known characteristics of the proposed base station.

In some embodiments of the present invention, the second data comprises a power spectrum density indication for the existing wireless network at the measurement location. In these embodiments, the processing step may further include estimating the power spectrum density at the measurement location for the wireless network with the proposed base station added using the power spectrum density indication for the existing wireless network at the measurement location, and an estimate of the signal strength for a signal received at the measurement location from the proposed base station. The power spectrum density indication may comprise a combination of signal strengths for a plurality of signals received at a measurement location from existing base stations within the wireless network. In some implementations, the plurality of signals received at the measurement location may comprise a predetermined subset of all signals received at the measurement location from existing base stations within the wireless network, the predetermined subset including signals with the greatest signal strengths received at the measurement location from existing base stations.

In some embodiments, the second data comprises a signal strength for at least one communication signal received at the measurement location from at least one existing base station within the wireless network. The processing step can further include estimating a signal-to-noise ratio for a communication channel at the measurement location transmitted by the existing base station. The estimate of the signal-to-noise ratio can equal to the signal strength for the communication signal received at the measurement location from the existing base station divided by the estimate of the power spectrum density at the measurement location for the wireless network with the proposed base station added. In some embodiments, the processing step could further include estimating a signal-to-noise ratio for a communication channel at a measurement location transmitted by the proposed base station. The estimate of the signal-to-noise ratio can equal to the estimate of the signal strength for a signal received at the measurement location from the proposed base station divided by the estimate of the power spectrum density at the measurement location for the wireless network with the proposed base station added.

According to some aspects, the second data may comprise signal strengths for a plurality of communication signals received at the measurement location, each communication signal corresponding to a respective one of a plurality of communication channels transmitted by one or more existing base stations within the wireless network. In this aspect, the processing step can include estimating a signal-to-noise ratio for each of the plurality of communication channels at the measurement location. Each signal-to-noise ratio can be equal to the signal strength for the respective communication signal received at the measurement location from the corresponding existing base station divided by the estimate of the power spectrum density at the measurement location for the wireless network with the proposed base station added. According to some implementations, the communication signals may correspond to a plurality of pilot signals corresponding to respective communication channels transmitted by one or more existing base stations within the wireless network.

In some embodiments, the processing step further includes determining if at least one of the communication channels at a measurement location transmitted by a proposed base station and one of the existing base stations has an estimated signal-to-noise ratio equal to or greater than an acceptable signal threshold level. The processing step may further include estimating the number of handoff states available to a wireless device at a measurement location within the wireless network with the proposed base station added by counting the number of communication channels at the measurement location transmitted by the proposed base station or one of the existing base stations that have an estimated signal-to-noise ratio equal to or greater than an acceptable signal threshold level. The processing step may further include estimating if a wireless device at a measurement location would have an acceptable number of handoff states, an acceptable number of handoff states being between one and an acceptable maximum threshold level of handoff states.

In other embodiments of the first broad aspect, the first data comprises data representative of a test signal received at each of a plurality of measurement locations from a test transmitter at the proposed location, and the second data comprises data representative of at least one communication signal received at each of the plurality of measurement locations from the existing wireless network. In this case, the processing step can include processing the first and second data to estimate at least one signal characteristic at each of the plurality of measurement locations for the wireless network with the proposed base station added. In some embodiments, the method further comprises collecting the first and second data at the plurality of measurement locations. In this case, the collecting step can comprise measuring a signal strength for a test signal received at each of the plurality of measurement locations from the test transmitter at the proposed location, measuring a signal strength for a communication signal received at each of the plurality of measurement locations from the existing wireless network, and measuring a power spectrum density indication for the existing wireless network at each of the plurality of measurement locations. The first and second data may be collected at respective first and second frequencies, the second frequency being a used frequency within the existing wireless network and the first frequency being an unused frequency within the existing wireless network.

In some embodiments of the present invention, the signal characteristic can include at least one of: a power spectrum density at the measurement location for the wireless network with the proposed base station added; a signal-to-noise ratio for a communication channel at the measurement location transmitted by the proposed base station within the wireless network with the proposed base station added; a signal-to-noise ratio for a communication channel at the measurement location transmitted by an existing base station within the wireless network with the proposed base station added; an indication of the number of handoff states available at the measurement location within the wireless network with the proposed base station added; and an indication of whether a wireless device at the measurement location within the wireless network with the proposed base station added would have an acceptable number of handoff states.

The method may further include transmitting graphical user interface data to a display apparatus. The graphical user interface data can comprise geographical information depicting at least a portion of the wireless network and the estimate of a signal characteristic to be delineated local to the measurement location within the geographical information.

A second broad aspect of the present invention seeks to provide an apparatus for analysing a wireless network with a proposed base station added at a proposed location. The apparatus includes an input device operable to receive first and second data, the first data comprising a signal strength for a test signal received at the measurement location from a test transmitter at the proposed location and the second data comprising a power spectrum density indication at the measurement location for the existing wireless network. The apparatus further includes a processing apparatus, coupled to the input device, operable to estimate a power spectrum density at the measurement location for the wireless network with the proposed base station added using the first and second data.

A third broad aspect of the present invention seeks to provide a computer readable media tangibly embodying a program of instructions executable by a computing apparatus to perform a method. The first step of the method is receiving first data representative of a test signal received at a measurement location from a test transmitter at the proposed location. The second step of the method is receiving second data representative of a communication signal received at the measurement location from the existing wireless network. The third step of the method is processing the first and second data to estimate a signal characteristic at the measurement location for the wireless network with the proposed base station added.

A fourth broad aspect of the present invention seeks to provide a method for analysing a wireless network with a proposed base station added at a proposed location. The first step of the method is receiving first data comprising a signal strength for a test signal received at a measurement location from a test transmitter at the proposed location. The second step of the method is receiving second data comprising a power spectrum density indication for the existing wireless network at the measurement location and signal strengths for a plurality of communication signals received at the measurement location, each communication signal corresponding to a respective one of a plurality of communication channels transmitted by one or more existing base stations within the wireless network. The third step of the method is estimating a signal strength for a signal received at the measurement location from the proposed base station using the signal strength for the test signal. The fourth step of the method is estimating a power spectrum density at the measurement location for the wireless network with the proposed base station added using the power spectrum density indication for the existing wireless network at the measurement location and the estimate of the signal strength for a signal received at the measurement location from the proposed base station. The fifth step of the method is estimating a signal-to-noise ratio for a communication channel at the measurement location transmitted by the proposed base station by dividing the estimate of the signal strength for a signal received at the measurement location from the proposed base station by the estimate of the power spectrum density at the measurement location for the wireless network with the proposed base station added. The sixth step of the method is estimating a signal-to-noise ratio for each of the plurality of communication channels at the measurement location, each signal-to-noise ratio comprising the signal strength for the respective communication signal received at the measurement location from the corresponding existing base station divided by the estimate of the power spectrum density at the measurement location for the wireless network with the proposed base station added.

BRIEF DESCRIPTION OF THE DRAWINGS

Embodiments of the present invention are described with reference to the following figures, in which:

FIG. 8 is a pictorial diagram illustrating a sample output of the system according to one embodiment of the present invention;

FIG. 9 is a flowchart depicting the steps performed to refine the behaviour of a wireless communication network according to one embodiment of the present invention.

FIG. 10 is a table depicting a format of displaying collected data according to one embodiment of the present invention.

DETAILED DESCRIPTION OF EMBODIMENTS OF THE PRESENT INVENTIONS

Figure 1:
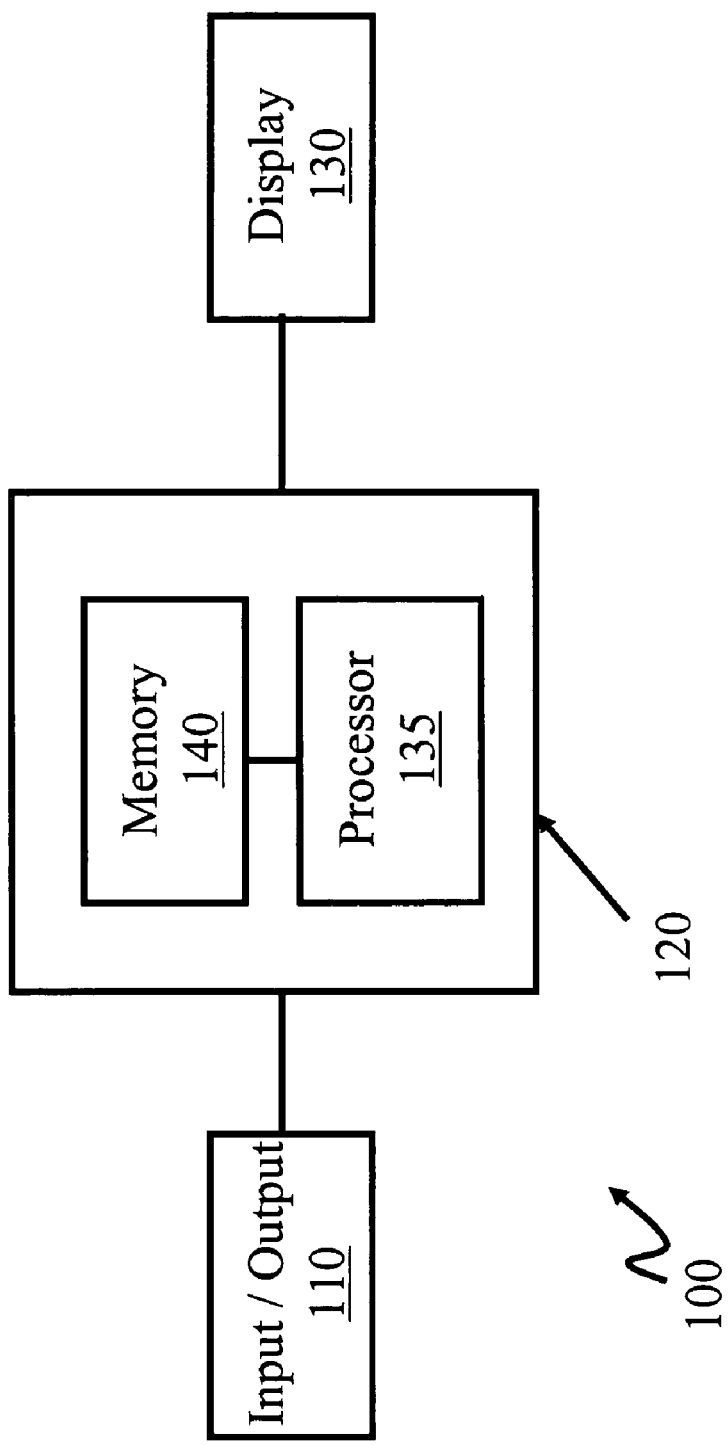
FIG. 1 is a block diagram depicting a system operable to conduct coverage analysis in a wireless communications network according to embodiments of the present invention.

FIG. 1 depicts a system 100 operable to conduct coverage analysis in a network according to embodiments of the present invention. The system 100 comprises an input/output apparatus 110, a computing apparatus 120, and display apparatus 130. The computing apparatus is operable to analyze data and comprises a processor apparatus 135 and a memory apparatus 140. The system 100 is configured to receive network and test transmitter data through the I/O apparatus 110, process the network and test transmitter data with the processor apparatus 135, store the results of the processed data on the memory apparatus 140, and display results of the processed data on the display apparatus 130. In one embodiment the system 100 is a computer, such as a personal computer, that is typically comprised of hardware suitable for processing data and includes a central processing unit, a random access memory, hard-disk storage, a network interface for communicating over a network, and removable media storage for transferring data from device to device.

Figure 2:
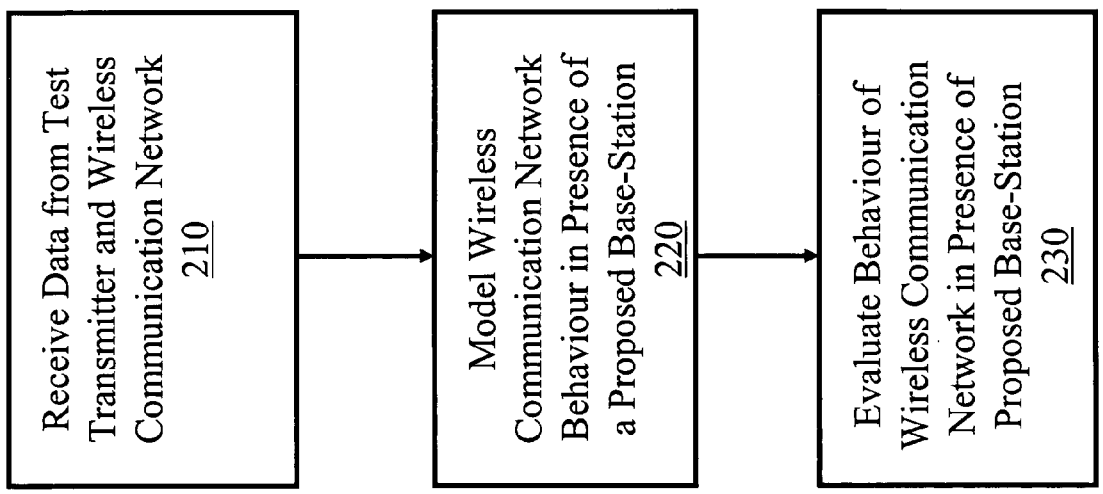
FIG. 2 is a flowchart depicting the steps performed to analyse wireless communications network coverage with a network coverage analysis system according to an embodiment of the present invention.

FIG. 2 depicts a flow chart of a method 200 for evaluating the location and characteristics of a proposed base station in a wireless communication network, according to an embodiment of the present invention. The method 200 can be performed by the wireless coverage analysis system 100 of FIG. 1. As depicted at step 210, the analysis system 100 receives data that has been measured and collected from a test transmitter of known characteristics, erected at a proposed location for a proposed network base station, and concurrently receives data that has been collected from a plurality of communication channels of the existing network. The data is measured and collected at a plurality of geographic locations. Each geographic location where data is collected comprises a measurement location. The analysis system 100 at step 220 uses the data collected in step 210 to model the behaviour of the network in the presence of channels that would be introduced into the network if the new base station were erected. In one embodiment, this modelling includes an estimate of at least one signal characteristic at, at least one measurement location for the wireless communication network with the base station added. In a further embodiment, this analysis is performed at a plurality of geographic locations. In another embodiment, this analysis is performed at a single location. It should be understood that the model of the wireless communications network at step 220 may be stored in memory apparatus 140 for future examination or evaluation. The channels may further comprise a plurality of communication channels or communication subchannels including an identifying or pilot channel, a paging channel and a traffic channel. Method 200 may be applied to the channel or an appropriate subset of subchannels.

The analysis system 100 at step 230 then uses the model to evaluate the behaviour of the wireless communications network in the presence of the additional channels to determine if the proposed base station would have a positive or negative impact on the existing network. In one embodiment this evaluation is performed at a plurality of geographic locations. In another embodiment this evaluation is performed for only a single location.

Figure 3:
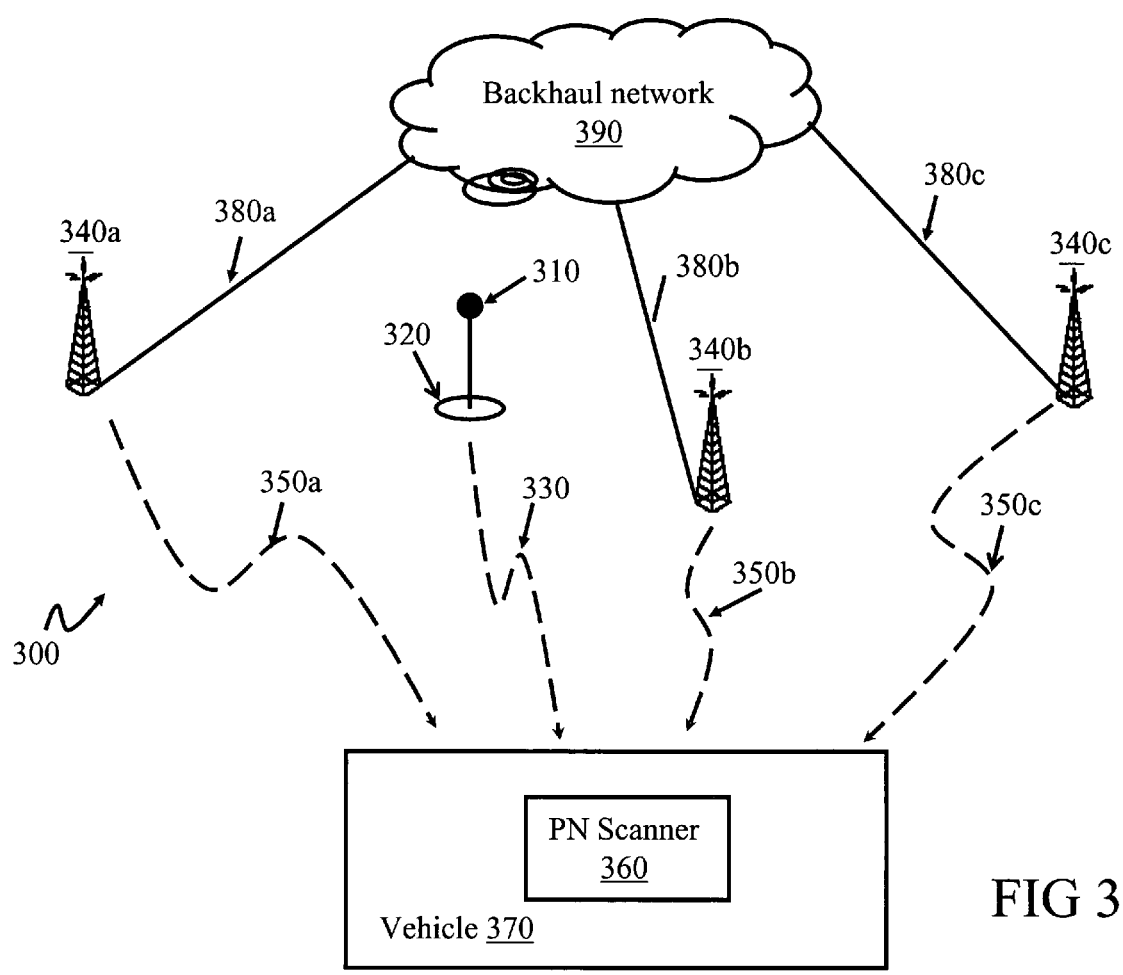
FIG. 3 is a pictorial diagram illustrating a sample system that could be analyzed using an embodiment of the present invention.

Reference is now made to FIG. 3, which pictorially illustrates one method of collecting the data referred to in FIG. 2. In this embodiment, a test transmitter 310 is erected at a location 320, which has been proposed as a site for a new base station in a wireless communication network 300. The test transmitter is operable for emitting a signal 330 of known characteristics. The existing wireless communications network comprises a plurality of base stations 340a, 340b, and 340c, each broadcasting a signal over a channel 350a, 350b, 350c respectively. Alternatively each base station 340 may broadcast a plurality of signals over plurality of channels. The base stations 340a, 340b and 340c are operable to communicate with each other through a backhaul network 390, via lines 380a, 380b, and 380c, respectively. In one embodiment the backhaul network 390 may further interface to other communications networks such as the telephone system or the internet. One skilled in the art would understand that typically a wireless communications network would have more base stations and channels than those depicted in FIG. 3.

The strength of the signal 330 emitted by the test transmitter 310, and the strength of the signals emitted by the existing base station channels 350, as well as the total network signal strength, are measured and recorded at a plurality of geographic measurement locations using a device 360. The location of the measurement, time of day and sequence ID is also measured and recorded by said device 360. Sequence ID refers to the numerical position of a measurement in a sequence of measurements, with the first measurement labelled 1, the second labelled 2, etc. In alternative embodiments, the device 360 may be substituted by a plurality of devices each of which measure different combinations of signal strength, geographic location, time of day and sequence ID. In certain embodiments, only signal strength and geographic location are measured. In one embodiment, the device or devices 360 are transported through the geographic area using a motorized vehicle 370. It should be understood that the device or devices 360 could be transported by a plurality of motorized vehicles or by one or more technicians.

The strength of the signals 330 and 350 will vary according to distance from the antenna or base stations, the level of traffic on the wireless communications network 300, the time of day, and the nature of the land-cover, also known as clutter. The clutter has the effect of absorbing the broadcast signals, and scattering and reflecting the signals, leading to unpredictability in calculating the strength of the signal when it reaches a given geographic area. In some circumstances, clutter will lead to a reduction in strength of the signal, in other circumstances the clutter may channel the signal leading to unexpectedly high signal strength some distance from the source.

Figure 4A:
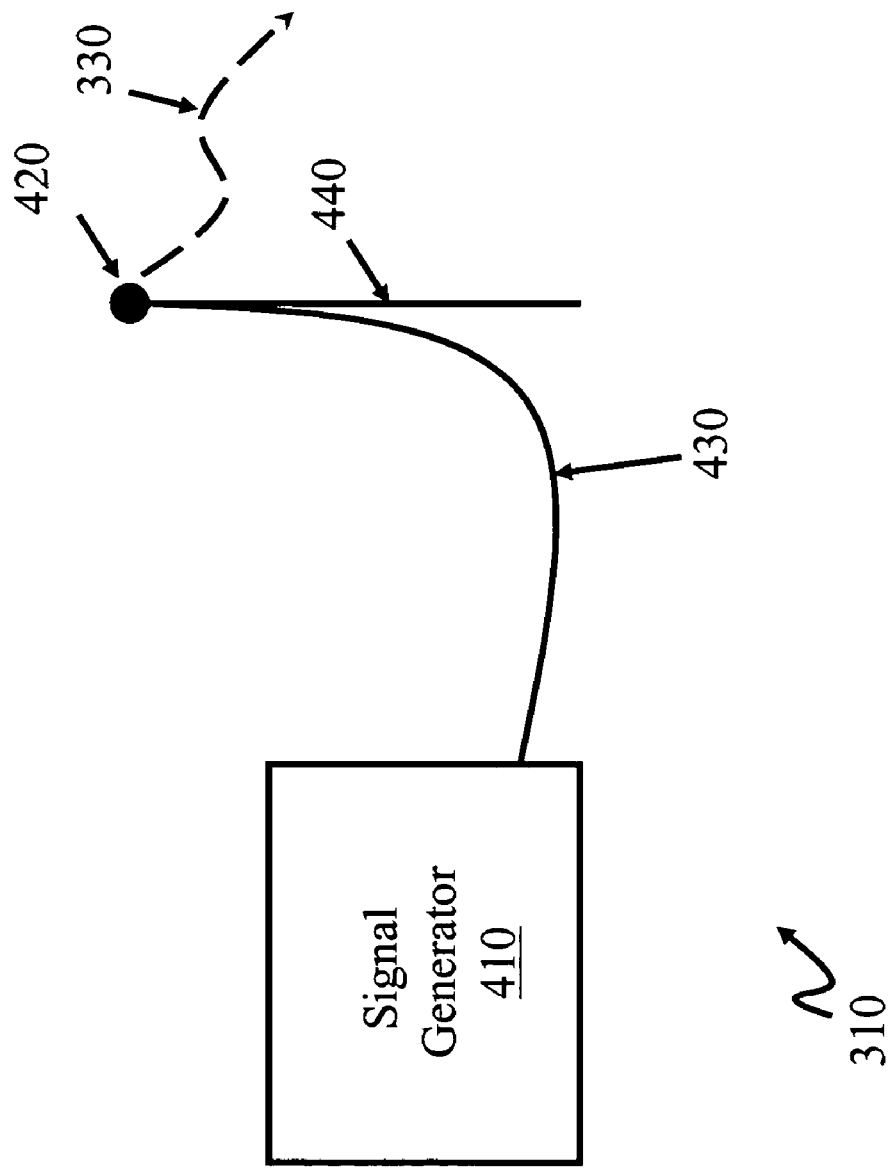
FIG. 4a is a pictorial diagram illustrating a test transmitter used in one embodiment of the present invention.

FIG. 4a depicts details of the test transmitter 310 according to one embodiment of the present invention. The test transmitter 310 comprises a signal generator 410, coupled to an antenna 420, via a cable 430. The antenna is mounted on a pole 440, of known height above ground level. Examples of signal generators and antennas include those manufactured by Andrew Corporation, 31225 Bainbridge Road, Solon, Ohio 44139 United States. The signal generator 410 generates a test signal 330 of known characteristics that is transmitted to the antenna 420 via the cable 430 and broadcast by the antenna 420.

Figure 4B:
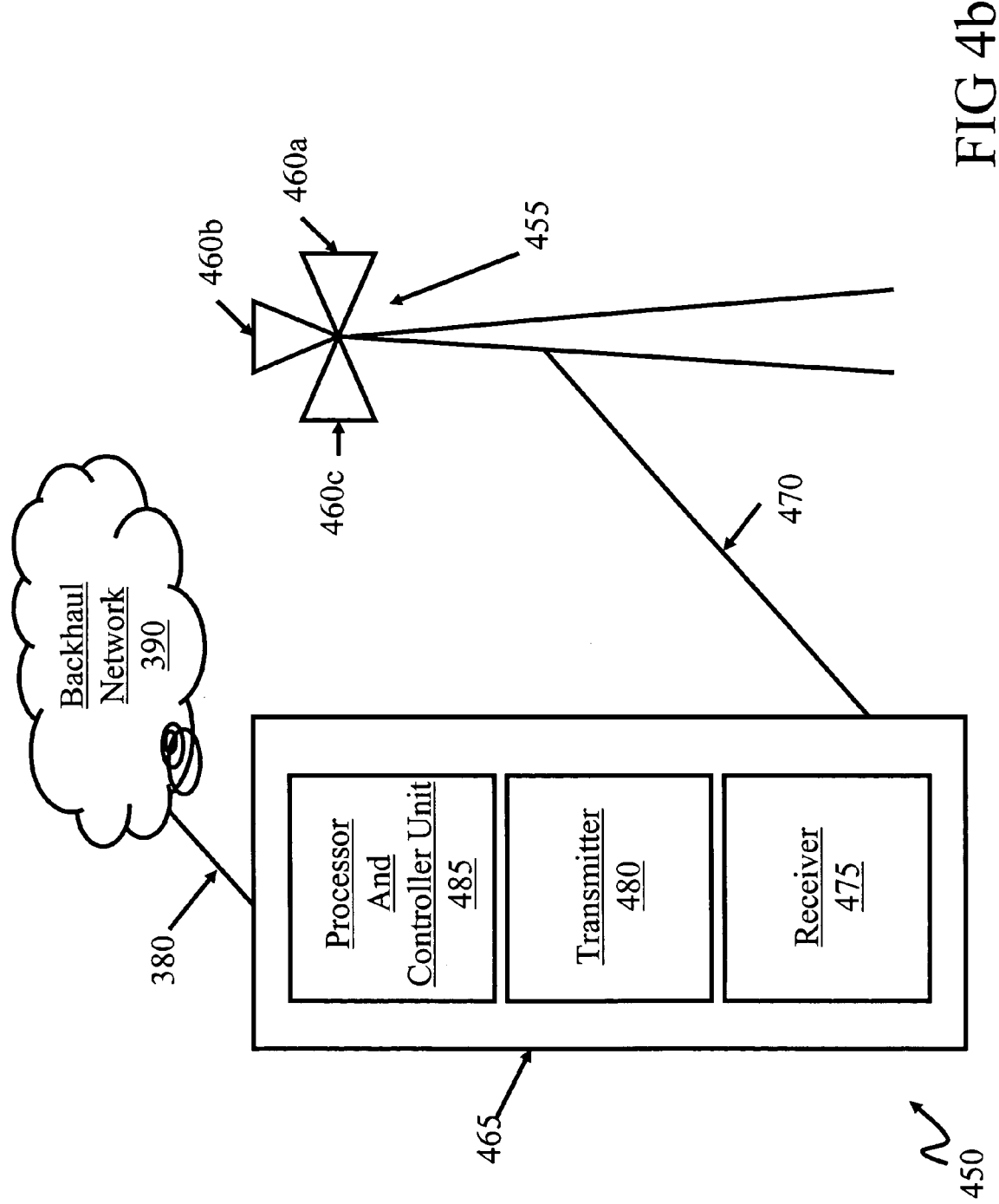
FIG. 4b is a pictorial diagram illustrating a wireless network communication base station used in one embodiment of the present invention.

FIG. 4b depicts details of a proposed base station, according to one embodiment of the present invention that could be included at location 320, as will be described in more detail below. The base station 450 comprises an antenna 455 with a plurality of sectors 460a, 460b, 460c, a base station transceiver (BTS) subsystem 465, and a cable 470 to connect the antenna to the BTS. The BTS comprises a receiver 475, a transmitter 480, and a processor and controller unit 485, for processing network data and communicating with a backhaul network, 390, via a line 380. Each sector 460 is operable to broadcast a signal 350 in a specific geographic direction. The number of channels originating from a base station 450 is equivalent to the number of sectors 460 associated with the structure of antenna 455. One skilled in the art would understand that different antennae may have structures that have a different number of sectors than is depicted in FIG. 4b.

In some embodiments of the present invention the method 200 is applied to analyzing the wireless coverage within a Code Division Multiple Access (CDMA) wireless communication network. One skilled in the art would understand that a CDMA wireless communication networks use spread-spectrum technology in which data is transmitted and received over channels utilizing a range of frequencies, with each channel being uniquely identified by a channel pilot signal, Ec, over which is broadcast a unique sequence code chosen from a range of numbers between 1 and 512. The power assigned to each channel is thus distributed between this pilot channel signal and a traffic or data channel signal, E. Consequently, each signal in the network can be correlated to a specific channel and a specific base station.

Returning now to FIGS. 3 and 4, the test transmitter 310, is erected at a site 320 of known latitude and longitude. In this non-limiting example, the signal 330 is broadcast on a known frequency, not typically in use by the CDMA network, to be compatible with CDMA network measurement equipment. Known characteristics of said test transmitter 310 include, but are not limited to, signal generator output power, signal channel, cable losses, antenna gain, and antenna height. A further characteristic of the test transmitter 310 is the antenna directionality. In this embodiment, the antenna 420 is a single sector, omni-directional antenna, operable to broadcast the signal 330 equally in all directions. In one embodiment the device 360 in FIG. 3, used to detect test transmitter signals 330 and wireless communication network signals, 350, is a PN scanner and GPS module operable in combination to measure and record a pilot signal strength data, Ec, for a plurality of pilot channels in a CDMA wireless communication network, total power spectrum density, Io, of the CDMA wireless communication network, location data, time of day data and sequence ID data. One example of the device 360 is an E6474-A Agilent Wireless Network Optimization Platform produced by Agilent Technologies of Palo, Alto Calif., which comprises a PN scanner and a GPS module, though other devices will occur to those skilled in the art.

The device 360 is installed in a motorized vehicle 370 and driven within a grid in an area surrounding the test transmitter 310. The size of the area is chosen such that the resulting data set will demonstrate the effect of the proposed base station on the coverage in the area surrounding its location 320, as well as its impact on coverage of existing base stations 340. In this example, the device 360 is programmed to measure and record a data point every 100 ms. A typical data point will consist of the time, sequence ID number, longitude, latitude, and one of: the test signal strength at the location; or the 10 strongest pilot signals of the existing network at the location and their associated pilot channel numbers, along with the total network power spectrum density, Io, at the location. Though the 10 strongest pilot signals are recorded in this example, other numbers of pilot signals will occur to those with skill in the art. In one example, four measurements are made, in sequence, of the test signal strength 330, while every fifth measurement is a measurement of the 10 strongest pilot signals and their associated channels along with the total network power spectrum density. In another example, alternating measurements are made between the test signal strength 330 and the measurement of the 10 strongest pilot signals and their associated channels along with the total network power spectrum density. In a further example the device or devices 360, measurement of the test signal strength 330 and the measurement of the 10 strongest pilot signals are performed at the same time. It should be understood that other sequences of measuring the data will occur to those skilled in the art.

A potential sequence of measurements of the device 360 in this embodiment is shown in FIG. 10; the actual storage format of the measurements in a particular device 360 is proprietary to each commercial device. In this table, each row represents a data measurement sequence, with the exception of the first row which shows the labels for the data. The first column shows the measurement type: either a test transmitter signal measurement (labelled TTSj in FIG. 10), existing network pilot channel measurement (Ecj, $P_{Nj}$), or total power density spectrum measurement (Io). For example the first measurement sequence, shown in the first data measurement row, records the strength of the test transmitter at the location, j, recorded in decibels (dBm) in the sixth column as received signal strength intensity (RSSI). Also recorded is the sequence ID of 1 for the first measurement, and the time. The location, j, of the measurement is also recorded as the latitude and longitude of location, j, in decimal notation. The frequency of the TTS is also recorded. Alternatively the test transmitter may be configured to broadcast over a pilot channel that is not used by the wireless communication network, and this channel number may be recorded in the column labelled $P_N$. The next three measurement sequences, shown in the next three rows, also record the strength of the test transmitter at the next three locations, every 100 ms. The next eleven rows shows the fifth measurement sequence which, in this example records, pilot channel numbers of the ten strongest pilot signals, $P_{Nj}$, at the location, j, of the measurement, and the RSSI of the pilot signal of each of these channels, $E_{cj}$, recorded in decibels (dBm); as well, the total power density spectrum, $Io_j$, of the ten strongest pilot signals at the location, j, is recorded in decibels (dBm). Alternatively the strength of the various signals, test transmitter, pilot signals and power spectrum density, could be recorded in absolute linear terms with units such as milliWatts, mW.

This sequence of measurements is repeated with the next four measurement sequences again recording the strength of the test transmitter 310 while the fifth measurement sequence again measures $Io_j$, $P_{Nj}$ and $Ec_j$.

In an alternate embodiment, the data for collecting time, location, test transmitter signal strength, and network data, including $Io_j$, $P_{Nj}$ and $E_{cj}$, may be recorded concurrently by a plurality of devices located in the motorized vehicle, 370. Further, the test transmitter signal 330 and the wireless communications network data may be collected by a plurality of devices 360 located in separate motorized vehicles, where each vehicle is equipped to measure either transmitter signal strength and geographic location, or network data and geographic location. The vehicles may drive around the area at different times of the day, and drive different routes, with data being later coordinated using geographic location. In a further embodiment, the same motorized vehicle 370 is driven around an area twice, where the first pass is used to first collect either the test transmitter signal strength 330 and geographic location, or wireless communication network data and geographic location, and the second pass is used to collect the other set of data. The vehicle may drive different routes on each pass. The data can later be coordinated using geographic location. Other methods of collecting data will occur to those with skill in the art and the description of potential methods of collecting the test transmitter signal 330, wireless communication network data and geographic locations is not meant to limit the scope of the present invention.

As previously described with reference to FIG. 2, the next step 220 in evaluating the location and characteristics of a proposed base station in the wireless communication network, is to input the empirical data collected to the system 100. When said data is received by the analysis system 100 of FIG. 1, said system 100 models the behaviour of a wireless communication network in the presence of additional channels being broadcast by the proposed base station, should it be erected at the proposed location, at step 220. The data collected is input to the system 100, and the behaviour of the network in the presence of the proposed base station is modeled at a plurality of geographic locations, each of which corresponds to a location where the empirical data was measured.

Figure 5:
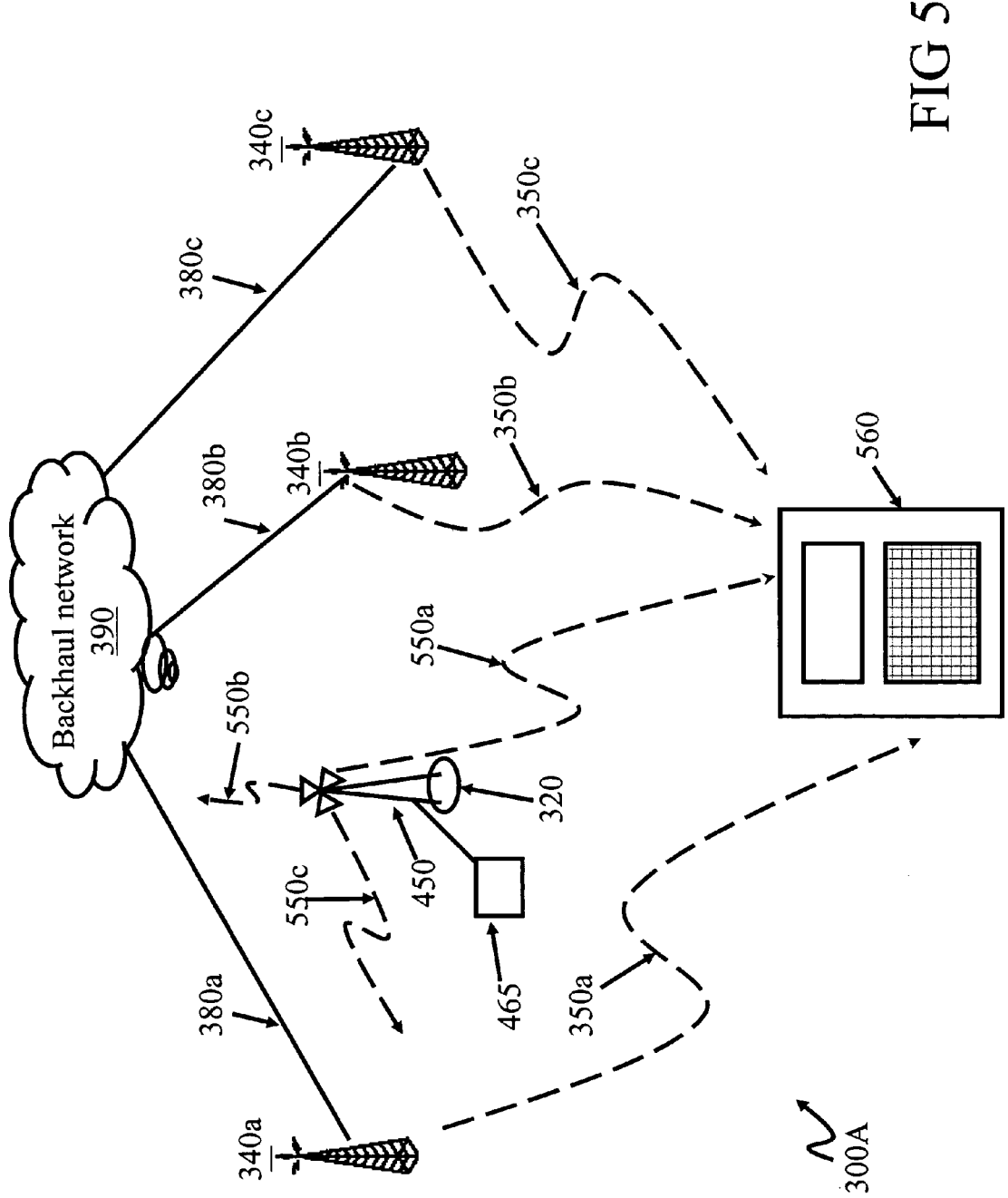
FIG. 5 is a pictorial diagram illustrating a sample system that could be modeled with a network coverage analysis system according to an embodiment of the present invention.

Reference is now made to FIG. 5 which pictorially depicts one wireless communications network 300A that may be modeled according to one embodiment of the present invention. One skilled in the art will recognize that this figure is similar to FIG. 3 except that the test transmitter 310 at location, 320, is substituted with the proposed base station 450 at the same location, 320. Furthermore, as in the wireless communication network 300 depicted in FIG. 3, the wireless communications network 300A depicted in FIG. 5 comprises a plurality of base stations, 340a, 340b, 340c, each broadcasting a signal over a channel, 350a, 350b, 350c respectively. Alternatively each base station 340 may broadcast a plurality of signals over plurality of channels. One skilled in the art would understand that a network would have more base station and channels than those depicted in FIG. 5. In this embodiment the proposed base station will comprise the base station 450 depicted in FIG. 4b, though it should be understood that other proposed base stations are possible. Known characteristics of the proposed base station 450 include, but are not limited to, effective total radiated power, pilot channel signal power, antenna type, number of sectors, antenna gain, antenna azimuth, antenna elevation and sector cable losses.

In this non-limiting example the base station 450 emits signals 550a, 550b, and 550c corresponding to three sectors of the proposed base station antenna, however other antennae with other numbers of sectors will occur to those with skill in the art. The plurality of signals 350a, 350b, 350c, 550a, 550b, 550c emitted from the base stations 340a, 340b, 340c, including the proposed base station 450, may be detected by a wireless radio communications device 560 in order to establish communication with the wireless communication network 300A. In one embodiment the wireless communication network 300A is a CDMA network where the signal broadcast from each base station comprises a channel pilot signal and a data signal, and the wireless radio communications device 560 is a CDMA enabled cell-phone.

Figure 6:
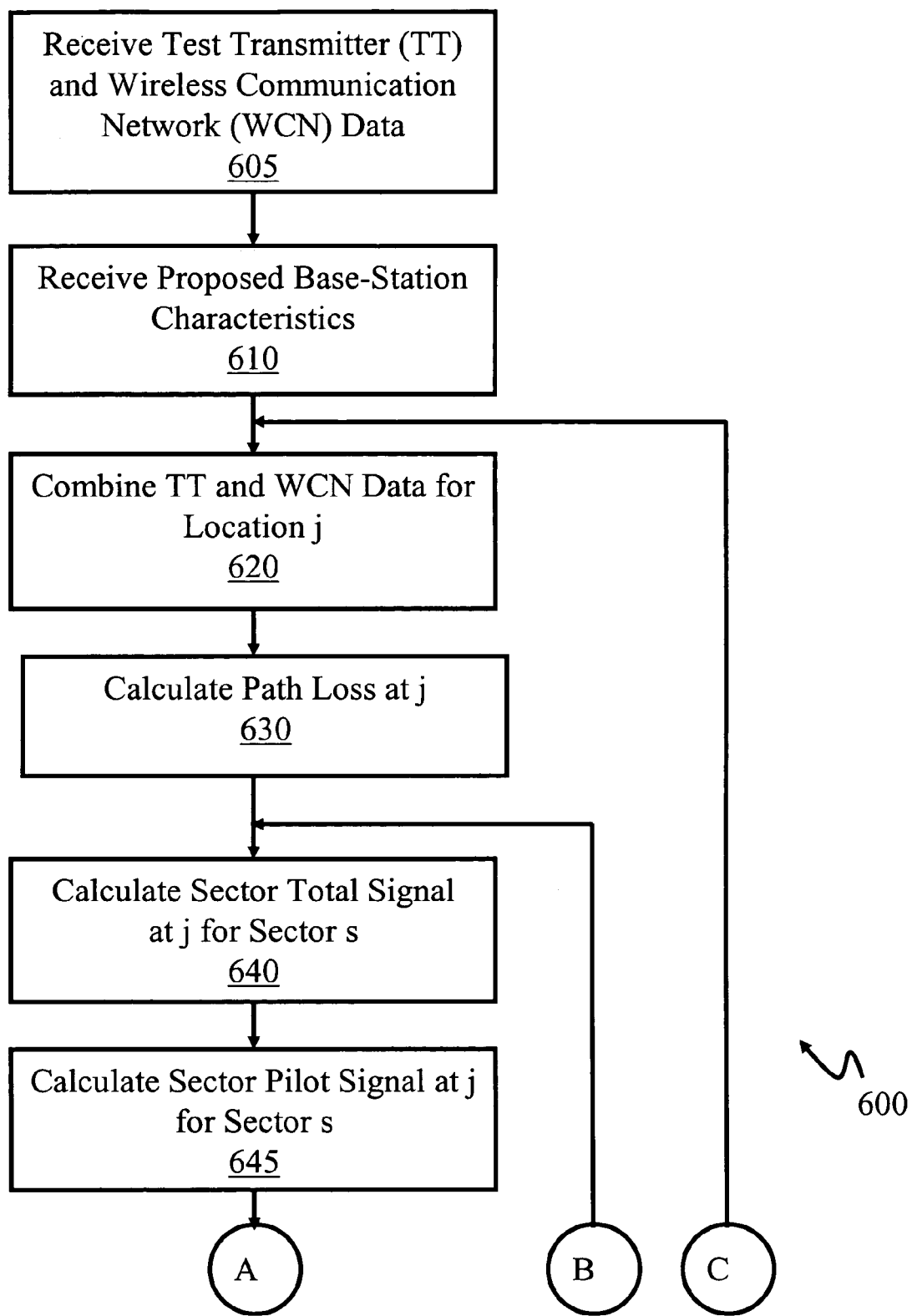
FIG. 6 is a flowchart depicting the steps performed to model the behaviour of a wireless communication network according to one embodiment of the present invention.
Figure 6:
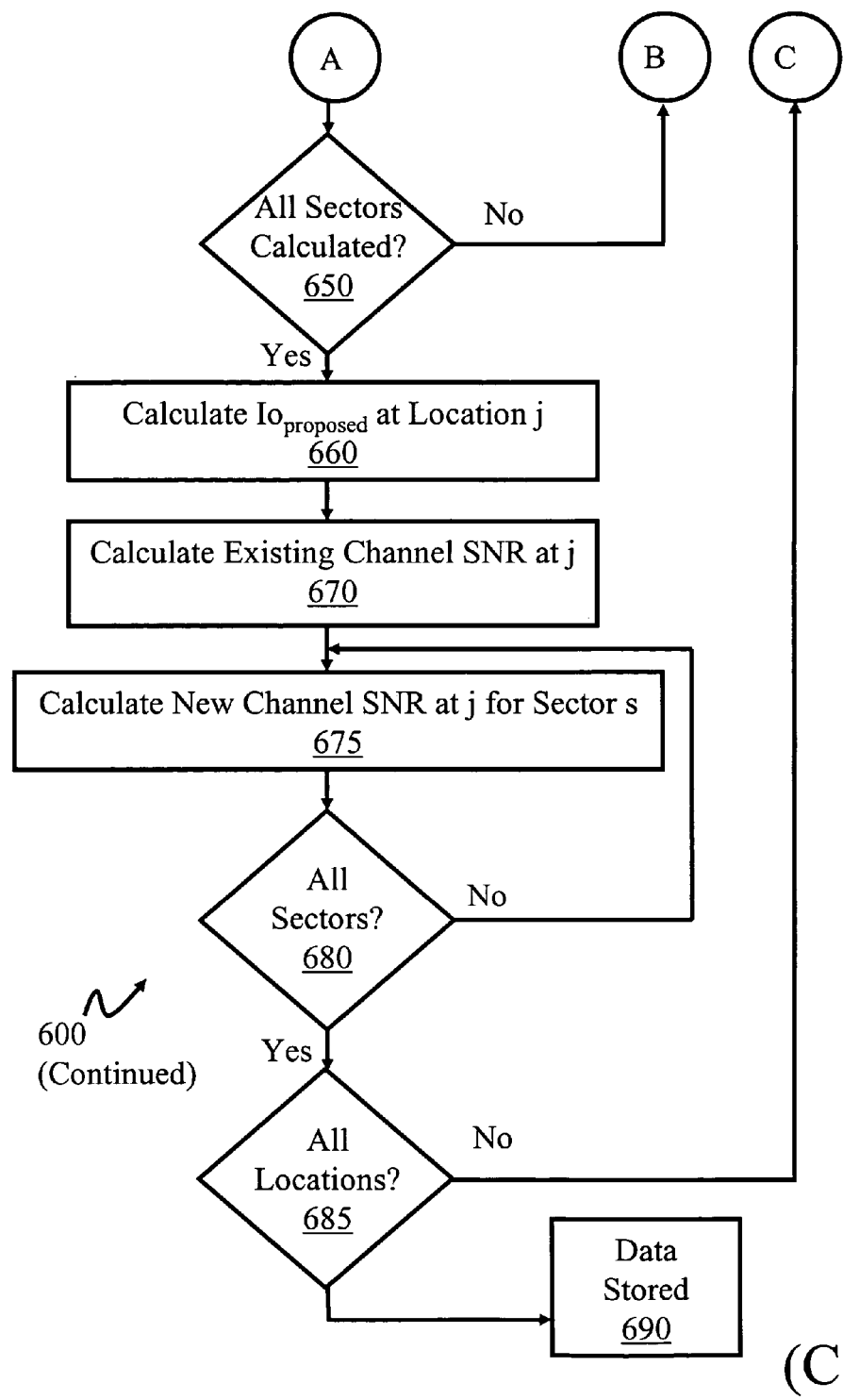

Reference is now made to FIG. 6, which depicts a method 600, for modeling the behaviour of a wireless communication network at a plurality of geographic locations that can be performed by a system as depicted in FIG. 1, should a proposed base station 450 be erected at a proposed location 320, as depicted in FIG. 5. Method 600 is one embodiment of step 220 as depicted in FIG. 2. In this embodiment the system 100 receives empirical data collected from the test transmitter 310 and the wireless communication network 300, at step 605, and further receives the characteristics of the proposed base station 450 at step 610. Characteristics of the base station include, but are not limited to, effective total radiated power, pilot channel signal power, antenna type, number of sectors, antenna gain, antenna azimuth, antenna elevation and sector cable losses.

The system 100, at step 620, then combines data collected from the test transmitter 310 and the wireless communication network 300 into a single data set, to obtain a combined data set. This combined data set depicts the strength of the test transmitter signal 330 and the behaviour of the wireless communications network 300 at similar locations, at similar points in time. In an alternative embodiment, the data from the test transmitter 310 and the wireless communications network 300 may be collected at different times, and combined into a single data set which depicts the strength of the test transmitter signal 330 and the behaviour of the wireless communications network 300 at similar locations.

In a non-limiting example, the device 360 is programmed to output three data files. The format of the first data file is shown in Table 1. In this first data file the test transmitter data is compiled to show the time of the measurement, the sequence ID number, the latitude and longitude of the measurement and the strength of the test transmitter signal, TTSj, at this location. This data is a subset of the data depicted in FIG. 10. The format of the recorded latitude and longitude is similar to that of FIG. 10.

TABLE 1

| Time | Sequence ID | Longitude | Latitude | TTSj (dBm) |
|---|---|---|---|---|
| 12:00.00.1 | 1 | −79.3442 | 43.76658 | −53.8906 |
| 12:00.00.2 | 2 | −79.3441 | 43.76659 | −53.9219 |
| 12:00.00.3 | 3 | −79.3440 | 43.76660 | −55.3438 |
| 12:00.00.4 | 4 | −79.3439 | 43.76661 | −54.9063 |
| 12:00.00.6 | 6 | −79.3437 | 43.76661 | −54.7656 |
| ... | ... | ... | ... | ... |

The format of the second data file is shown in Table 2. In this second data file CDMA power spectrum density, Io, is recorded for the 10 strongest pilot signals, at each measurement location. The data is compiled to output the time of the measurement, the sequence ID number, the latitude and longitude of the measurement, and the Io, with units of dBm. This data is a subset of the data depicted in FIG. 10.

TABLE 2

| Time | Sequence ID | Longitude | Latitude | Io (dBm) |
|---|---|---|---|---|
| 12:00.00.5 | 5 | −79.3438 | 43.76662 | −45.8616 |
| 12:00.00.5 | 10 | −79.3433 | 43.76657 | −44.9384 |
| 12:00.00.5 | 15 | −79.3428 | 43.76662 | −44.9384 |
| ... | ... | ... | ... | ... |

The format of the third data file is shown in Table 3. In this third data file, the 10 strongest pilot signals at the measurement location are recorded, along with their associated pilot channel numbers, for each measurement location. The data is compiled to output the time of the measurement, the sequence ID number, the latitude and longitude of the measurement, and the 10 strongest pilot signal values at the location, with units of dBm, and the channel number of each of the ten strongest pilot signal values at the measurement location. Typically the channel number is recorded as $P_N$, and the strongest pilot signals known as peak pilot signal are recorded as $E_{C,N}$. The time and location of the measurements in Tables 2 and 3 are similar, and in this example are separated by 500 ms increments. In this example the time and location of the measurements in Table 1 are taken in-between the measurements of Tables 2 and 3.

TABLE 3

| Time | Sequence ID | Longitude | Latitude | $E_{C,N}$ | $P_N$ |
|---|---|---|---|---|---|
| 12:01.00.500 | 5 | −79.3438 | 43.76662 | −64.1459 | 224 |
| 12:01.00.500 | 5 | −79.3438 | 43.76662 | −65.1969 | 256 |
| 12:01.00.500 | 5 | −79.3438 | 43.76662 | −65.8728 | 88 |
| 12:01.00.500 | 5 | −79.3438 | 43.76662 | −65.9632 | 324 |
| 12:01.00.500 | 5 | −79.3438 | 43.76662 | −66.1104 | 108 |
| 12:01.00.500 | 5 | −79.3438 | 43.76662 | −66.2549 | 340 |
| 12:01.00.500 | 5 | −79.3438 | 43.76662 | −66.4013 | 316 |
| 12:01.00.500 | 5 | −79.3438 | 43.76662 | −66.4805 | 48 |
| 12:01.00.500 | 5 | −79.3438 | 43.76662 | −66.4844 | 80 |
| 12:01.00.500 | 5 | −79.3438 | 43.76662 | −53.1217 | 228 |
| 12:01.01.000 | 10 | −79.3433 | 43.76657 | −63.8472 | 224 |
| 12:01.01.000 | 10 | −79.3433 | 43.76657 | −66.2547 | 404 |
| 12:01.01.000 | 10 | −79.3433 | 43.76657 | −66.2229 | 260 |
| 12:01.01.000 | 10 | −79.3433 | 43.76657 | −66.1477 | 36 |
| 12:01.01.000 | 10 | −79.3433 | 43.76657 | −66.0907 | 340 |
| ... | ... | ... | ... | ... | ... |

In this embodiment of the present invention the three data sets are combined to obtain a new data set which depicts the strength of the test transmitter signal and the behaviour of the network at similar locations, at similar points in time.

In this non-limiting example, the data is combined using the sequence ID, such that test transmitter signal measurements and the network signal measurements recorded at adjacent locations are combined into one file, as each measurement in the sequence is recorded at adjacent geographic locations. In FIG. 10 it is seen that the test transmitter signal is measured and recorded 4 times as often as each network measurement. Thus when combining the data, 3 out of the 4 test transmitter measurements are discarded. For example, the test transmitter measurements with sequence ID's 4, 9, 14, etc. are combined with the network measurements with sequence ID's 5, 10, 15, etc. It should be understood that other combinations of combining the test transmitter measurements and the network measurements according to sequence IDs are possible. In another embodiment averaging techniques may be used. For easy reference the sequence ID numbers are subsequently aligned in the combined data set. The locations and time of the adjacent measurements are similarly aligned. This new data set is depicted in Table 4.

In alternative embodiments, the three data sets depicted in Tables 1, 2 and 3 may be generated from a plurality of data sets measured by a plurality of devices and a plurality of transportation mechanisms, such as motorized vehicles or technicians on foot. In each embodiment, the measured signal data is recorded along with the location of the measurement. In these embodiments, the test transmitter signal data and network signal data may be combined into a single data set according to location. In some embodiments the two signal measurements are combined according to a binning process, in which measurements that lie within defined geographic boundaries are combined. In a non-limiting example, the geographic area where the measurements are taken is subdivided into 10 m$^2$ squares, and measurements falling into the same square are combined. In further embodiments, limits may be placed on the distance between two combined measurements. In other embodiments data may be binned according to time of day, if the geographic locations of the combined measurements are concurrent. It should be understood that measurements combined using binning may be averaged to obtain an average measurement for the bin, which may then be used in subsequent calculations. Also, binning may occur using a plurality of network data, which may be further averaged. Other methods of combining the test transmitter data and network data into a single data set will occur to those with skill in the art.

TABLE 4

| | Sequence ID | | | | |
|---|---|---|---|---|---|
| | 5 | | 10 | | 15 |
| Time | 12:00.00.5 | | 12:00.01.0 | | 12:00.01.5 |
| Longitude | −79.3438 | | −79.3433 | | −79.3428 |
| Latitude | 43.76662 | | 43.76657 | | 43.76662 |
| Test Transmitter RSSIj (dB) | −54.9063 | | −57.4219 | | −57.1563 |
| Io | −45.8616 | | −44.9384 | | −44.9384 |
| Ec, PNj | −64.1459 | 224 | −63.8472 | 224 | −63.8472 | 224 |
| Ec, PNj | −65.1969 | 256 | −66.2547 | 404 | −66.2547 | 404 |
| Ec, PNj | −65.8728 | 88 | −66.2229 | 260 | −66.2229 | 260 |
| Ec, PNj | −65.9632 | 324 | −66.1477 | 36 | −66.1477 | 36 |
| Ec, PNj | −66.1104 | 108 | −66.0907 | 340 | −66.0907 | 340 |
| Ec, PNj | −66.2549 | 340 | −65.8406 | 200 | −65.8406 | 200 |
| Ec, PNj | −66.4013 | 316 | −65.8141 | 324 | −65.8141 | 324 |
| Ec, PNj | −66.4805 | 48 | −64.6095 | 316 | −64.6095 | 316 |
| Ec, PNj | −66.4844 | 80 | −52.8234 | 228 | −52.8234 | 228 |
| Ec, PNj | −53.1217 | 228 | −65.6572 | 448 | −65.6572 | 448 |
| Ec, PNj | −64.1459 | 224 | −63.8472 | 224 | −63.8472 | 224 |

Returning now to FIG. 6, the system 100 at step 630 estimates the path loss of a signal as it travels from the proposed location 320 of the proposed base station 450 to a geographic location. Path loss occurs due to degradation and scattering of the signal as it travels through space and also due to terrain and land-cover between the location of the proposed base station 450 and the geographic location. In one embodiment the path loss is estimated by comparing the measured strength of the test transmitter 310 at the geographic location, to the known broadcast strength of the test transmitter signal 330, adjusted for cable losses and antenna gain. In this manner, the empirical effect of terrain and land-cover is known at each geographic location in the data set depicted in Table 4. In alternate embodiments, path loss may be estimated from the data depicted in Table 1, prior to combining the data sets at step 620.

The calculation for the step at 630 can be represented as:

$$PL_j = Tx - TTS_j$$

where $PL_j$ is the path loss at a geographic location, j, $TTS_j$ is the received signal strength of the test transmitter from Table 4 at j, and Tx is the known broadcast strength of the test transmitter signal, adjusted for cable losses and antenna gain. $PL_j$ is typically defined as a positive quantity; in other words, a positive loss. This calculation is shown as a subtraction, as the values are measured using a logarithmic scale. Alternatively the equation may be expressed as a ratio if the values are measured on a linear scale or converted to a linear scale.

The system, at step 640, calculates the strength of a signal of a sector of the proposed base station 450 at a geographic location, if the proposed base station 450 were erected at the proposed location 320, as depicted in FIG. 5. This occurs in a two step process where the gain of the sector is initially calculated at the geographic location. The proposed location, height, and known characteristics of the base station antenna 455 are used to obtain the gain of the sector at the geographic location. Known characteristics of the proposed base station antenna 455 include but are not limited to the number of sectors of the antenna, elevation and azimuth of each sector, and antenna relative gain pattern of each sector. In one embodiment, the relative horizontal angle and vertical angles between the antenna and location of each point of the combined data set are generated from the known latitude and longitude of each point of the combined data set and comparing this to the known location of the antenna, using well-known trigonometric relationships. The angles are then used to look-up the gain of the sector at the geographic location, in an antenna relative gain pattern reference input table, said reference input table being available from the manufacturer of the proposed antenna. An example of such a reference input table, PCS19SA-06314-0DG.txt, is available from Andrew Corporation, describing the relative gain pattern of the Andrew PCS19SA-06314-0DG antenna. In an alternative embodiment the gain of the antenna may be obtained by inputting the angles into mathematical equations which describe the antenna relative gain pattern, which may be generated for an antenna using well-known techniques.

The gain of the sector at the geographic location is then combined with the proposed total signal strength of the sector, hereinafter referred to as the effective radiated power (ERP). These values are further combined with the $PL_j$ at the geographic location, calculated at step 630. This combination estimates the strength of the signal from that particular sector of the proposed base station 450 at the geographic location. The calculation for this step can be represented as:

$$E_{j,s} = \text{Sector ERP} + AG_{j,s} - PL_j$$

where $E_{j,s}$ is the strength of the proposed base station signal for each sector, s, at the geographic location, j, $PL_j$ is the path loss at a geographic location, j, calculated at step 630, Sector ERP is the known broadcast signal strength of the sector, s, and $AG_j$ is the gain of the sector, s, of the proposed antenna at the geographic location, j. This calculation is shown as a summation, as the values are measured using a logarithmic scale. Alternatively the equation may be expressed as a multiplication if the values are measured on a linear scale or converted to a linear scale.

The system 100 at step 645 estimates the strength of a pilot signal of a sector of the antenna of the proposed base station 450 at a geographic location, if the proposed base station were erected at the proposed location, as depicted in FIG. 5, in a manner similar to that of step 640. The gain of the sector at the geographic location, calculated at step 640, is combined with the proposed pilot signal strength of the sector, hereinafter referred to as the Pilot Sector ERP. These values are further combined with the path loss data calculated at step 630. This combination estimates the strength of the pilot signal from that sector of the proposed base station at the geographic location. The calculation for this step can be represented as:

$$Ep_{j,s} = \text{Pilot Sector ERP} + AG_{j,s} - PL_j$$

where $Ep_{j,s}$ is the strength of the proposed base station pilot signal for each sector, s, at the geographic location, j, $PL_j$ is the path loss at a geographic location, j, calculated at step 630, Pilot Sector ERP is the known pilot broadcast signal strength of the sector, s, and $AG_j$ is the gain of the sector, s, of the proposed base station at the geographic location, j. This calculation is shown as a summation, as the values are measured using a logarithmic scale. Alternatively the equation may be expressed as a multiplication if the values are measured on a linear scale or converted to a linear scale.

Steps 640 and 645 are repeated at step 650 for each sector of the base station. In an alternative embodiment $E_j$ and $Ep_j$ for all sectors may be calculated concurrently. In a further embodiment one of $E_j$ and $Ep_j$ may be calculated for all sectors, and then the other of $E_j$ and $Ep_j$ may be calculated for all sectors.

The system 100 at step 660 estimates the total wireless communication power spectrum density, $Io_{proposed}$, at a geographic location if the proposed base station 450 were erected at the proposed location. $Io_{proposed}$ is calculated from the measured $Io_j$ at the geographic location, j, recorded in Table 5, and the total sum of $E_{j,s}$, that is present at the geographic location. The total $I_o$ is calculated by summing the resultant $E_{j,s}$ from each sector. The calculation for this step can be represented as:

$$I_{Oproposed,j} = \log\left(\log^{-1}(Io_j) + \left(\sum_{s=1}^{N}\log^{-1}(E_{j,s})\right)\right)$$

where $Io_{proposed,j}$, is the total wireless communication power spectrum density at a geographic location, j, if the proposed base station 450 were built, $Io_j$ is the measured power spectrum density at the geographic location and recorded in Table 5, $E_{j,s}$ is the strength of the proposed base station signal for each sector, s, at the geographic location, j, and N is the total number of sectors in the proposed base station. This calculation shows a series of conversions from a logarithmic scale to a linear scale and again back to a log scale, as the values $Io_j$ and $E_{j,s}$ are measured using a logarithmic scale. Alternatively the equation may be expressed as a summation without these conversions if the values are measured on a linear scale or converted to a linear scale.

The system 100 at step 670 estimates the resulting signal to noise ratio (SNR) of existing pilot signals at a geographic location, if the proposed base station 450 were built at the proposed location 320. The SNR of existing pilot signals at the geographic location are calculated from the existing pilot signals, as recorded in the combined data set, calculated at step 620, and the total wireless communication power spectrum density at a geographic location, $Io_{proposed,j}$ calculated at step 660. The calculation for this step can be represented as:

$$(Ec/Io)_{proposed,N,j} = \log^{-1}(E_{CN,j} - Io_{proposed,j})$$

where $(Ec/Io)_{proposed,N,j}$ is the new SNR of each previously measured existing channel pilot signal at the geographic location, j; $E_{CN,j}$ is the strength of the $N^{th}$ existing channel pilot signal, at the geographic location, j, from the combined data set calculated at step 620; $Io_{proposed,j}$ is the total wireless communication power spectrum density at a geographic location, j, if the proposed base station 450 were built, calculated at step 660. Continuing with the non-limiting example given above, N=1, 2 . . . 10, such that 10 values for $(Ec/Io)_{proposed,N,j}$ are calculated at the geographic location, j. This calculation is shown as a subtraction and subsequent conversion to a linear scale, as the values are measured using a logarithmic scale. The equation may also be expressed as a ratio if the values are measured on a linear scale or converted to a linear scale. Typically, however, Ec/Io is reported as a ratio in CDMA networks.

The system 100 at step 675 calculates the resulting SNR of a proposed pilot signal at a geographic location, if the proposed base station 450 were built. Each sector of the proposed base station will contribute an additional pilot signal to the network. The SNR of the proposed pilot signal at the geographic location is calculated from the strength of the signal of the corresponding sector of the base station, at the geographic location, calculated at step 645, and the total wireless communication power spectrum density at a geographic location, $Io_{proposed,j}$ calculated at step 660. The calculation for this step can be represented as:

$$(Ec/Io)_{proposed,j,s} = \log^{-1}(Ep_{j,s} - Io_{proposed,j})$$

where $(Ec/Io)_{proposed,j,s}$ is the SNR of the proposed pilot signal at the geographic location, j; $Ep_{j,s}$ is the strength of the proposed base station pilot signal for each sector, s, at the geographic location, j; $Io_{proposed,j}$ is the total wireless communication power spectrum density at a geographic location, j, if the proposed base station 450 were built, calculated at step 660. This calculation is shown as a subtraction and subsequent conversion to a linear scale, as the values are measured using a logarithmic scale. The equation may also be expressed as a ratio if the values are measured on a linear scale or converted to a linear scale. Typically, however, Ec/Io is reported as a ratio in CDMA networks.

Step 675 is repeated at step 680 for each sector of the proposed base station 450. It should be understood that $Ep_j$ for all sectors could be calculated concurrently. It should be further understood that the SNR of the sectors of the proposed base station 450 could be calculated before the SNR of the existing pilot signals at the geographic location, step 670.

Continuing with the non-limiting example of a 3 sector base station, s=1,2,3 such that 3 values for $(Ec/Io)_{proposed,j,s}$ are calculated. The result is N'=N+s different SNRs, $(Ec/Io)_{proposed,N'}$, for the N' pilot signals, are calculated at the geographic location. In the non-limiting example N'=13, in which the top 10 pilot signals were measured at each geographic location and the proposed base station 450 has 3 sectors.

Steps 620 through 680 are repeated at step 685 for each geographic location, j. In an alternative embodiment all calculations at each step may be performed concurrently for each geographic location. In yet further embodiments it may be desired to perform the method for only a single geographic location.

Once all SNRs are calculated for all N' pilot signals, at all locations, j, the system 100 stores the resulting data set in the memory apparatus 140 at step 690.

The data set that results from method 600 is a matrix of values that represent the behaviour of the wireless communications network 300A if the proposed base station 450 were built at the proposed location 320, at a plurality of geographic locations surrounding the proposed base station location. These values, include but are not limited to, the power spectrum density, Io, the N strongest pilot signal strength of the existing network at each location, the s proposed pilot signals at each location, and estimates of the SNRs of each of the existing and proposed pilot signals. This data set may be subsequently used to evaluate the behaviour of the wireless communications network 300A if the proposed base station 450 is implemented.

Figure 7:
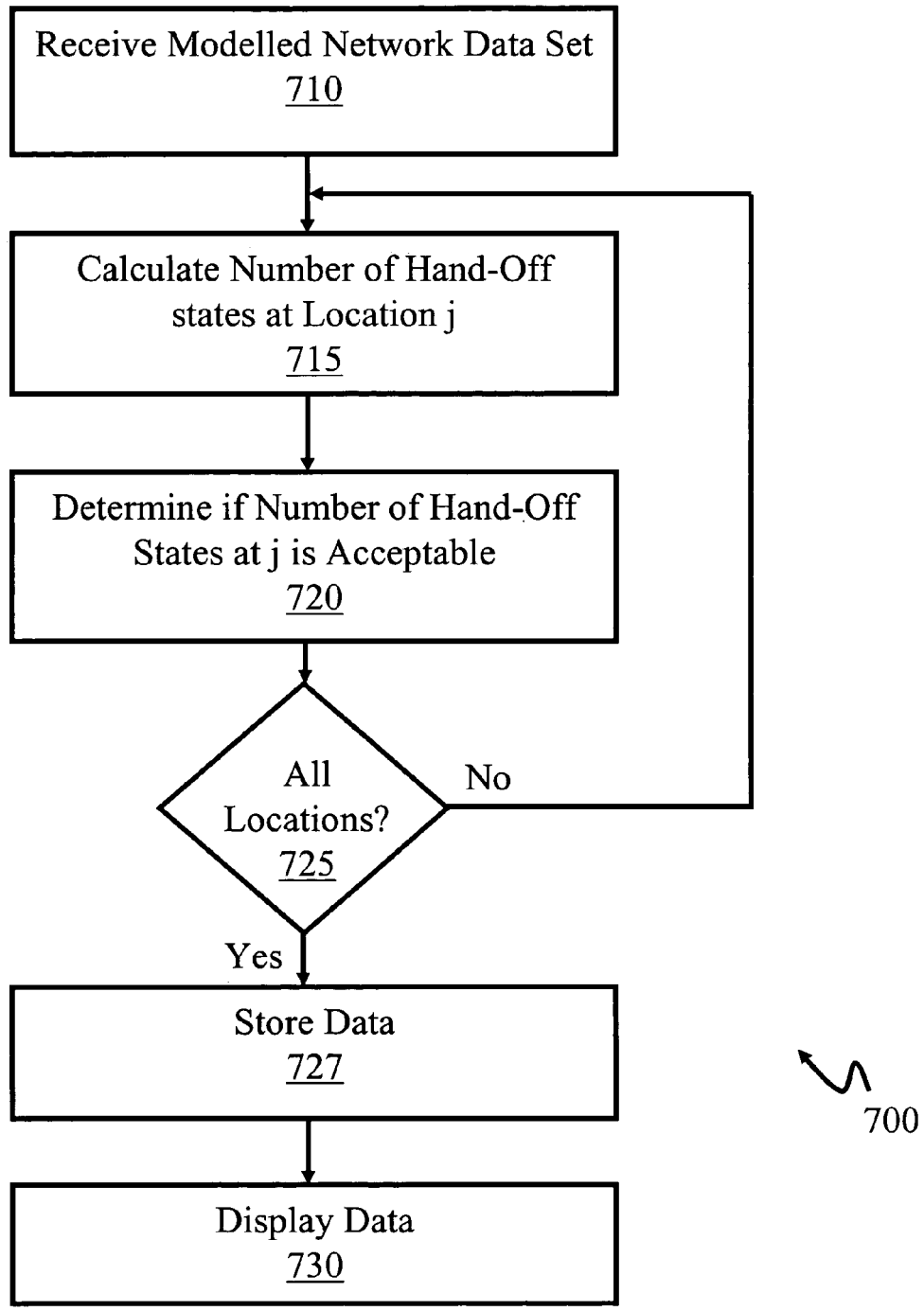
FIG. 7 is a flowchart depicting the steps performed to evaluate the behaviour of a wireless communication network according to one embodiment of the present invention.

Reference is now made to FIG. 7, which depicts a flow diagram showing a method 700 for evaluating the behaviour of the wireless communications network 300A in the presence of the proposed base station 450 should it be erected at a proposed location 320, which can be performed by the system depicted in FIG. 1. Method 700 is one embodiment of step 230 as depicted in FIG. 2. The system 100 at step 710, receives the modelled network data calculated in method 600. The system at step 715 calculates the number of channels that are available as hand-off states, $HO_j$, to a radio communications device at a geographic location, j. A hand-off state is a channel that is in communication with the device, and represents a viable means for the device to communicate with the network. In order for a channel to be a suitable hand-off state, the SNR of the channel at the location must be above a threshold value in order to be detected by a radio communication device located at the site. The number of possible hand-off states for each location is determined by counting the number of SNRs that are greater than or equal to the threshold value. This calculation may be represented as:

$$HO_j = \sum_{y=1}^{N'} (SNR_{j,y} \geq T_1)$$

where $HO_j$ is the number of available hand-off states at a geographic location, j; N' is the number of channels that are being evaluated at the location, j; y is a placeholder representing a channel being evaluated; $SNR_{j,y}$ is the SNR of channel y, at location, j; and $T_1$ is the threshold value above which $SNR_{j,y}$ is detectable by a radio communications device.

Continuing with the non-limiting example, using CDMA networks, and CDMA cell phones, each of N' SNRs calculated at each geographic location are compared to a threshold value in the range of −100 to −1 dB, and typically in the range of −20 to −1 dB. In North American CDMA networks a threshold value of approximately −16 dB is used, though other threshold values will occur to those with skill in the art.

The system 100 at step 720 determines if an acceptable number of hand-off states are available to a radio communications device 560 at the geographic location, should the proposed base station 450 be erected at the proposed location 320. At a minimum, one hand-off state must be available to the device 560 in order that it may communicate with the network. However an upper limit is also placed on the number of hand-off states available to the device, as too many hand-off states may result in the device 560 attempting to communicate with an unacceptable number of channels in the wireless communications network 300A, resulting in dropped calls and decreased quality of service. Hence, the number of possible hand-off states available to the radio communications devices at the geographic location is compared to a second threshold value. This threshold value represents the maximum number of hand-off states that should be available to the radio communications device 560 to ensure quality of service. This comparison may be represented as:

$$1 \leq HO_j \leq T_2$$

where $HO_j$ is the number of available hand-off states at a geographic location, j; and $T_2$ is the number of hand-off states available to a radio communications device, above which the device will begin to drop an unacceptable number of calls.

In one embodiment, the minimum number of acceptable hand-off states is one and an acceptable maximum number of hand-off states in a location is chosen from a range of 1 to 10 and typically in the range of 2 to 5. In North American CDMA networks a threshold value of 3 can be used, though other threshold values will occur to those with skill in the art.

Steps 715 and 720 are repeated at step 725 for each geographic location where modeling has occurred. In an alternative embodiment, all calculations at each step may be performed concurrently for each geographic location. In a further embodiment step 720 may be performed after hand-off states are calculated at all locations. Alternatively step 720 may be performed at a later analysis to be described shortly.

The system 100 stores the resulting data set in the memory apparatus 140 at step 727. At this step the data set may be saved on the memory apparatus for future examination and evaluation.

The system 100 at step 730 displays the modeled data. This will allow for the proposed base station 450 to be evaluated in the context of the larger wireless communications network 300A. In one embodiment the data is displayed on a graphical user interface (GUI) representing a map of the geographic area surrounding the proposed base station 450. In one embodiment the map may include all geographic areas where test transmitter measurements were recorded. In alternative embodiments only areas of particular interest may be displayed on the GUI. This map may include any of the data calculated in method 600 or in method 700 including for example the number of hand-off states, Io, or Ec.

FIG. 8 depicts a pictorial diagram of displayed data according to one embodiment of the present invention. This GUI 800 depicts a map 810 showing the number of hand-off states 820 of the network available to a radio communication device, at each measurement location of the combined data set. The GUI additionally depicts the existing base stations, 340a, 340b, 340c, at their existing geographic sites, and the proposed base station 450 at the proposed site. Alternatively the GUI 800 may depict: SNRs due to the proposed base station; SNRs due to at least one existing base station; aggregate SNR for a plurality of base stations including the proposed base station and the existing base stations; overall network activity including power spectrum density; best hand-off state; an indication of whether a wireless device at the measurement location within the wireless network with the proposed base station added would have an acceptable number of handoff states including colour-coded icons, where the colour of the icon represents acceptable and unacceptable numbers of hand-off states; coverage of the area by a particular base station, or the number of hand-off-states available to a radio communications device at a plurality of geographic locations. Any of these signal characteristics could be delineated local to the measurement location within a GUI depicting the wireless communication network. This delineation may be depicted in numerous forms including textual and graphical representations.

In an alternative embodiment the modeled data could be displayed in the form of a report. Other information that will determine the suitability of the proposed base station 450 at the proposed location 320 can be displayed in further embodiments, or the modeled data could be saved as a data set on a storage medium, including but not limited to a computer hard drive or computer memory, for later analysis.

FIG. 9 is a flowchart depicting a method 900 showing the steps performed to refine the behaviour of a wireless communication network according to one embodiment of the present invention. In one embodiment the method 900 is performed by the system 100 depicted in FIG. 1. In another embodiment the method may be performed by a technician. In either event, the goal is to determine if the proposed base station 450 should be erected at the proposed location 320, to propose and evaluate a different base station configuration at the proposed location 320, or to propose and evaluate a new location for a base station.

The system 100 at step 910 analyzes the modeled network data output from methods 600 and 700 to determine, at step 920, if the coverage introduced into the network by the proposed base station 450 is acceptable. In one embodiment this determination may be automated by indicating if all geographic locations measured have an acceptable number of hand-off states as determined at step 720. Alternatively the calculation performed at step 720 may be incorporated into this step. In a further embodiment this determination may be performed by comparing the modeled data output to an additional data set which represents an acceptable state of the wireless communications network 300A. In another embodiment this determination may be made by a technician, who is able to examine the displayed data from step 730 and establish if the proposed base station 450 is acceptable, or not. This displayed data may include the data calculated at step 720, or the technician may perform step 720 intuitively by examining the total number of hand-off states displayed on the GUI of step 730. It should be understood that the technician may also examine the data stored at step 727 to make a similar determination. It should be further understood that the criteria for determining the acceptability of a proposed base station 450, in all embodiments, may include an acceptable number of locations which do not meet criteria for acceptable behaviour. If the proposed base station is determined to be acceptable, then at step 930 the system recommends erection of the proposed base station 450 at the proposed location 320. In a further embodiment the system 100 may generate statistics or a histogram, which could be compared to a pre-determined acceptable threshold.

If the proposed base station 450 is unacceptable then the system 100 has the option of modifying the characteristics of the proposed base station 450, at step 940, and remodelling the wireless communications network 300A. If the modification occurs then the model of the wireless communications network 300A in the presence of the proposed base station 450 is recalculated, at step 950, from step 610 through to the method 700. Base station characteristics that may be modified may include but are not limited to: number of sectors in an antenna, type of antenna, azimuth of antenna, elevation of antenna, and base station power. Other characteristics will occur to those with skill in the art. In this manner the effect of different base station characteristics on the wireless communications network 300A may be examined without having to re-erect a test transmitter 310 at a new proposed location. This process may be repeated with a plurality of combinations of base station characteristics. Alternatively the system 100 could select the combination of base station characteristics which results in an acceptable state of the wireless communications network 300A. In a further embodiment a technician could select and modify some characteristics and let the system 100 select and modify other characteristics, and further let the system 100 select the best combination of these other characteristics.

If a plurality of base station characteristics have been successively modified, and no acceptable combination of characteristics has been found, a new location may be proposed for a new base station, at step 960. In some cases, a new location may not be practical due, for example, to space restraints in the neighbourhood in question. In this case, the system 100 recognizes that all reasonable options have been exhausted and a report describing the results of the various tests is produced at step 970. This report may also present options to network planners based on the various tests. The network planners may decide to erect a base station in any event based on observed tradeoffs in the modeled systems, or apply the result to future network planning operations.

If testing an alternative location is a suitable option, the system 100 recommends relocation of the test transmitter 310 at step 980 and, at step 990, the method returns to step 210 of FIG. 2. In this case, the test transmitter is erected at a new location and a new collection of test transmitter data and network data is recorded. In an alternative embodiment, only the test transmitter data may be collected and later correlated with the previously collected network data.

In alternative embodiments the method 900 may be performed by a technician who is examining the modeled data sets.

Although the present invention was described in detail with respect to CDMA networks, the wireless communication network may be any wireless communication network in which access to the network is accomplished using multiple-access base stations and where hand-off occurs between the base stations. Such networks include, but are not limited to, the CDMA cellular network of the described embodiment, a GSM cellular network, a UTMS cellular network, an AMPS cellular network, a TDMA cellular network, a WiFi (802.11) network and a WiMax (802.16) network. Each network may be analyzed using embodiments of the invention described herein, though the operational details of each alternative network may vary. For example, the system 100 of FIG. 1 may be used to analyze the behaviour of the network in the presence of a proposed base station to be located at a proposed location using the method described in FIG. 2, using the steps of receiving data from a test transmitter and the wireless communications network, using said data to model the behaviour of the network in the presence of the proposed base station, and evaluating the behaviour of the network in the presence of the proposed base station. Alternatively the model of the network behaviour in the presence of the proposed base station may be saved in a memory apparatus 140 for later examination or evaluation.

While specific embodiments of the present invention have been described and illustrated, it will be apparent to those with skill in the art that numerous modifications and variations can be made without departing from the scope of the invention as defined in the appended claims.

I claim:

1. A method for analysing a wireless network with a proposed base station added at a proposed location, the method comprising:

receiving first data representative of a test signal received at a measurement location from a test transmitter at the proposed location, and second data representative of at least one communication signal received at the measurement location from the existing wireless network, wherein the first data comprises a signal strength for the test signal received at the measurement location, wherein the second data comprises a power spectrum density indication for the existing wireless network at the measurement location, and wherein the second data further comprises signal strengths for a plurality of communication signals received at the measurement location, each communication signal corresponding to a respective one of a plurality of communication channels transmitted by one or more existing base stations within the wireless network; and processing the first and second data to estimate at least one signal characteristic at the measurement location for the wireless network with the proposed base station added; wherein said processing comprises:

estimating a test signal strength for a signal received at the measurement location from the proposed base station using the signal strength for the test signal;

estimating a power spectrum density at the measurement location for the wireless network with the proposed base station added using the power spectrum density indication for the existing wireless network at the measurement location and an estimate of a total signal strength for a signal received at the measurement location from the proposed base station;

estimating a signal-to-noise ratio for a communication channel at the measurement location transmitted by the proposed base station, the estimate of the signal-to-noise ratio comprising the estimate of the test signal strength for a signal received at the measurement location from the proposed base station divided by the estimate of the power spectrum density at the measurement location for the wireless network with the proposed base station added; and estimating a signal-to-noise ratio for each of the plurality of communication channels at the measurement location, each signal-to-noise ratio comprising the signal strength for the respective communication signal received at the measurement location from the corresponding existing base station divided by the estimate of the power spectrum density at the measurement location for the wireless network with the proposed base station added;

estimating the number of handoff states available to a wireless device at the measurement location within the wireless network with the proposed base station added by counting the number of communication channels at the measurement location transmitted by the proposed base station or one of the existing base stations that have an estimated signal-to-noise ratio equal to or greater than an acceptable signal threshold level.

2. The method according to claim 1, wherein the estimating a test signal strength for a signal received at the measurement location from the proposed base station comprises estimating a path loss between the measurement location and the proposed location using the signal strength for the test signal and one or more known characteristics of the test transmitter and estimating the total signal strength for a signal received at the measurement location from the proposed base station using the path loss and one or more known characteristics of the proposed base station.

3. The method according to claim 1, wherein the power spectrum density indication for the existing wireless network at the measurement location comprises a combination of signal strengths for a plurality of signals received at the measurement location from existing base stations within the wireless network.

4. The method according to claim 3, wherein the plurality of signals received at the measurement location from existing base stations within the wireless network comprise a predetermined subset of all signals received at the measurement location from existing base stations within the wireless network, the predetermined subset including signals with the greatest signal strengths received at the measurement location from existing base stations.

5. The method according to claim 1, wherein the plurality of communication signals received at the measurement location comprise a plurality of pilot signals corresponding to respective communication channels transmitted by one or more existing base stations within the wireless network.

6. The method according to claim 1, further comprising determining if at least one of the communication channels at the measurement location transmitted by at least one of the proposed base station and one of the existing base stations has an estimated signal-to-noise ratio equal to or greater than an acceptable signal threshold level.

7. The method according to claim 1 further comprising estimating if a wireless device at the measurement location would have an acceptable number of handoff states, wherein an acceptable number of handoff states is between one and an acceptable maximum threshold level of handoff states.

8. The method according to claim 1, wherein the first data comprises data representative of the test signal received at each of a plurality of measurement locations from the test transmitter at the proposed location, and the second data comprises data representative of at least one communication signal received at each of the plurality of measurement locations from the existing wireless network; and wherein the processing step comprises processing the first and second data to estimate at least one signal characteristic at each of the plurality of measurement locations for the wireless network with the proposed base station added.

9. The method according to claim 8 further comprising collecting the first and second data at the plurality of measurement locations.

10. The method according to claim 9, wherein the collecting the first data comprises measuring a signal strength for the test signal received at each of the plurality of measurement locations from the test transmitter at the proposed location; and the collecting the second data comprises measuring a signal strength for the at least one communication signal received at each of the plurality of measurement locations from the existing wireless network and measuring a power spectrum density indication for the existing wireless network at each of the plurality of measurement locations.

11. The method according to claim 9, wherein the first and second data are collected at respective first and second frequencies, the second frequency being a used frequency within the existing wireless network and the first frequency being an unused frequency within the existing wireless network.

12. The method according to claim 1, wherein the at least one signal characteristic comprises at least one of: a power spectrum density at the measurement location for the wireless network with the proposed base station added; a signal-to-noise ratio for a communication channel at the measurement location transmitted by the proposed base station within the wireless network with the proposed base station added; a signal-to-noise ratio for a communication channel at the measurement location transmitted by an existing base station within the wireless network with the proposed base station added; an indication of the number of handoff states available at the measurement location within the wireless network with the proposed base station added; and an indication of whether a wireless device at the measurement location within the wireless network with the proposed base station added would have an acceptable number of handoff states.

13. The method according to claim 1, further comprising transmitting graphical user interface data to a display apparatus, the graphical user interface data comprising geographical information depicting at least a portion of the wireless network and the estimate of at least one signal characteristic to be delineated local to the measurement location within the geographical information.

14. The method according to claim 1, wherein the measurement location comprises at least one of a specific geographical location and a limited geographical area grouped together.

15. An apparatus for analysing a wireless network with a proposed base station added at a proposed location, the apparatus comprising:
   an input device operable to receive first and second data, the first data comprising a signal strength for a test signal received at the measurement location from a test transmitter at the proposed location and the second data comprising a power spectrum density indication at the measurement location for the existing wireless network, wherein the second data further comprises existing base station data comprising signal strengths for a plurality of communication signals received at the measurement location each communication signal corresponding to a respective one of a plurality of communication channels transmitted by one or more existing base stations within the wireless network; and
   a processing apparatus, coupled to the input device, operable to estimate a power spectrum density at the measurement location for the wireless network with the proposed base station added using the first and second data wherein the processing apparatus is further operable to:
      estimate a signal-to-noise ratio for a communication channel at the measurement location transmitted by the proposed base station using the first data and the estimate of the power spectrum density at the measurement location for the wireless network with the proposed base station added; and
      estimate a signal-to-noise ratio for each of the plurality of communication channels at the measurement location transmitted by one of the existing base stations using the existing base station data and the estimate of the power spectrum density at the measurement location for the wireless network with the proposed base station added;
      estimate the number of handoff states available to a wireless device at the measurement location within the wireless network with the proposed base station added by counting the number of communication channels at the measurement location transmitted by the proposed base station or one of the existing base stations that have an estimated signal-to-noise ratio equal to or greater than an acceptable signal threshold level.

16. The apparatus according to claim 15, wherein the power spectrum density indication for the existing wireless network at the measurement location comprises a combination of signal strengths for a plurality of signals received at the measurement location from existing base stations within the wireless network.

17. The apparatus according to claim 15, wherein the second data further comprises existing base station data comprising a signal strength for at least one communication signal received at the measurement location from at least one existing base station within the wireless network; and wherein the processing apparatus is further operable to estimate a signal-to-noise ratio for a communication channel at the measurement location transmitted by the existing base station using the existing base station data and the estimate of the power spectrum density at the measurement location for the wireless network with the proposed base station added.

18. The apparatus according to claim 15, wherein the processing apparatus is further operable to determine if at least one of the communication channels at the measurement location transmitted by at least one of the proposed base station and one of the existing base stations has an estimated signal-to-noise ratio equal to or greater than an acceptable signal threshold level.

19. The apparatus according to claim 15, wherein the processing apparatus is further operable to estimate if a wireless device at the measurement location would have an acceptable number of handoff states, wherein an acceptable number of handoff states is between one and an acceptable maximum threshold level of handoff states.

20. The apparatus according to claim 15, wherein the processing apparatus is further operable to transmit graphical user interface data to a display apparatus, the graphical user interface data comprising geographical information depicting at least a portion of the wireless network and an estimate of at least one signal characteristic at the measurement location for the wireless network with the proposed base station added, the at least one signal characteristic being estimated using the first and second data.

21. The apparatus according to claim 20, wherein the at least one signal characteristic comprises at least one of: the estimated power spectrum density at the measurement location for the wireless network with the proposed base station added; the estimated signal-to-noise ratio for a communication channel at the measurement location transmitted by the proposed base station within the wireless network with the proposed base station added; the estimated signal-to-noise ratio for a communication channel at the measurement location transmitted by an existing base station within the wireless network with the proposed base station added; an indication of the number of handoff states available at the measurement location within the wireless network with the proposed base station added, the number of handoff states equalling the number of estimated signal-to-noise ratios equal to or greater than an acceptable signal threshold level at the measurement location; and an indication of whether a wireless device at the measurement location within the wireless network with the proposed base station added would have an acceptable number of handoff states.

22. An apparatus for analysing a wireless network with a proposed base station added at a proposed location, the apparatus comprising:
   an input device operable to receive first and second data, wherein the first data comprises a signal strength for a test signal received at each of a plurality of measurement locations from a test transmitter at the proposed location, wherein the second data comprises a power spectrum density indication at each of the measurement locations for the existing wireless network, and wherein the second data further comprises existing base station data comprising signal strengths for a plurality of communication signals received at each of the measurement locations, each communication signal corresponding to a respective one of a plurality of communication channels transmitted by one or more existing base stations within the wireless network;

a processing apparatus, coupled to the input device, operable to estimate a power spectrum density at each of the measurement locations for the wireless network with the proposed base station added using the respective first and second data;

wherein the processing apparatus is further operable to estimate, for each of the measurement locations, a signal-to-noise ratio for a communication channel transmitted by the proposed base station using the respective first data and the estimate of the power spectrum density at the particular measurement location for the wireless network with the proposed base station added;

and wherein the processing apparatus is further operable to estimate, for each particular one of the measurement locations, a signal-to-noise ratio for each of the plurality of communication channels transmitted by one of the existing base stations using the existing base station data and the estimate of the power spectrum density at the particular measurement location for the wireless network with the proposed base station added;

and wherein the processing apparatus is further operable to estimate for each particular one of the measurement locations, the number of handoff states available to a wireless device at the particular measurement location within the wireless network with the proposed base station added by counting the number of communication channels at the particular measurement location transmitted by the proposed base station or one of the existing base stations that have an estimated signal-to-noise ratio equal to or greater than an acceptable signal threshold level.

23. The apparatus according to claim 22, wherein the processing apparatus is further operable to transmit graphical user interface data to a display apparatus, the graphical user interface data comprising geographical information depicting at least a portion of the wireless network and an estimate of at least one signal characteristic at one or more of the measurement locations for the wireless network with the proposed base station added, the at least one signal characteristic being estimated using the first and second data.

24. The apparatus according to claim 23, wherein the at least one signal characteristic at a particular one of the measurement locations comprises at least one of: the estimated power spectrum density at the particular measurement location for the wireless network with the proposed base station added; the estimated signal-to-noise ratio for a communication channel at the particular measurement location transmitted by the proposed base station within the wireless network with the proposed base station added; the estimated signal-to-noise ratio for a communication channel at the particular measurement location transmitted by an existing base station within the wireless network with the proposed base station added; an indication of the number of handoff states available at the particular measurement location within the wireless network with the proposed base station added, the number of handoff states equalling the number of estimated signal-to-noise ratios equal to or greater than an acceptable signal threshold level at the particular measurement location; and an indication of whether a wireless device at the particular measurement location within the wireless network with the proposed base station added would have an acceptable number of handoff states.

25. A non-transitory computer readable media tangibly embodying a program of instructions executable by a computing apparatus to perform the steps of:

receiving first data representative of a test signal received at a measurement location from a test transmitter at the proposed location, wherein the first data comprises a signal strength for the test signal received at the measurement location; receiving second data representative of at least one communication signal received at the measurement location from the existing wireless network, wherein the second data comprises a power spectrum density indication for the existing wireless network at the measurement location and a signal strength for at least one communication signal received at the measurement location from at least one existing base station within the wireless network;

processing the first and second data to estimate at least one signal characteristic at the measurement location for the wireless network with the proposed base station added, wherein the processing the first and second data comprises:

estimating a test signal strength for a signal received at the measurement location from the proposed base station using the signal strength for the test signal, estimating a power spectrum density at the measurement location for the wireless network with the proposed base station added using the power spectrum density indication for the existing wireless network at the measurement location and an estimate of a total signal strength for a signal received at the measurement location from the proposed base station;

estimating a signal-to-noise ratio for a communication channel at the measurement location transmitted by the proposed base station using the estimate of the test signal strength for a signal received at the measurement location from the proposed base station and the estimate of the power spectrum density at the measurement location for the wireless network with the proposed base station added;

estimating a signal-to-noise ratio for a communication channel at the measurement location transmitted by the existing base station using the signal strength for the communication signal received at the measurement location from the existing base station and the estimate of the power spectrum density at the measurement location for the wireless network with the proposed base station added;

estimating the number of handoff states available to a wireless device at the measurement location within the wireless network with the proposed base station added by counting the number of communication channels at the measurement location transmitted by the proposed base station or one of the existing base stations that have an estimated signal-to-noise ratio equal to or greater than an acceptable signal threshold level.

26. A method for analysing a wireless network with a proposed base station added at a proposed location, the method comprising:

receiving first data comprising a signal strength for a test signal received at a measurement location from a test transmitter at the proposed location;

receiving second data comprising a power spectrum density indication for the existing wireless network at the measurement location and signal strengths for a plurality of communication signals received at the measurement location, each communication signal corresponding to a respective one of a plurality of communication channels transmitted by one or more existing base stations within the wireless network;

estimating a test signal strength for a signal received at the measurement location from the proposed base station using the signal strength for the test signal;

estimating a power spectrum density at the measurement location for the wireless network with the proposed base station added using the power spectrum density indication for the existing wireless network at the measurement location and an estimate of a total signal strength for a signal received at the measurement location from the proposed base station;

estimating a signal-to-noise ratio for a communication channel at the measurement location transmitted by the proposed base station by dividing the estimate of the test signal strength for a signal received at the measurement location from the proposed base station by the estimate of the power spectrum density at the measurement location for the wireless network with the proposed base station added; and estimating a signal-to-noise ratio for each of the plurality of communication channels at the measurement location, each signal-to-noise ratio comprising the signal strength for the respective communication signal received at the measurement location from the corresponding existing base station divided by the estimate of the power spectrum density at the measurement location for the wireless network with the proposed base station added;

estimating the number of handoff states available to a wireless device at the measurement location within the wireless network with the proposed base station added by counting the number of communication channels at the measurement location transmitted by the proposed base station or one of the existing base stations that have an estimated signal-to-noise ratio equal to or greater than an acceptable signal threshold level; and estimating if a wireless device at the measurement location would have an acceptable number of handoff states, wherein an acceptable number of handoff states is between one and an acceptable maximum threshold level of handoff states.

\* \* \* \* \*